US008638951B2

(12) United States Patent
Zurek et al.

(10) Patent No.: US 8,638,951 B2
(45) Date of Patent: Jan. 28, 2014

(54) ELECTRONIC APPARATUS FOR GENERATING MODIFIED WIDEBAND AUDIO SIGNALS BASED ON TWO OR MORE WIDEBAND MICROPHONE SIGNALS

(75) Inventors: Robert Zurek, Anitoch, IL (US); Kevin Bastyr, St. Francis, WI (US); Joel Clark, Woodridge, IL (US); Plamen Ivanov, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 786 days.

(21) Appl. No.: 12/837,314

(22) Filed: Jul. 15, 2010

(65) Prior Publication Data

US 2012/0013768 A1 Jan. 19, 2012

(51) Int. Cl.

| | |
|---|---|
| ***H04R 3/00*** | (2006.01) |
| *H04N 5/76* | (2006.01) |
| *G06F 15/00* | (2006.01) |
| *G10L 19/00* | (2013.01) |

(52) U.S. Cl.
USPC ........... 381/92; 348/231.4; 704/200; 704/500

(58) Field of Classification Search
USPC ........... 381/92, 313, 327, 26, 119; 348/231.4; 704/200, 500
See application file for complete search history.

(56) References Cited

U.S. PATENT DOCUMENTS

| | | | |
|---|---|---|---|
| 4,334,740 A | 6/1982 | Wray | |
| 5,031,216 A | 7/1991 | Gorike et al. | |
| 6,041,127 A | 3/2000 | Elko | |
| 6,507,659 B1 | 1/2003 | Iredale et al. | |
| 6,983,055 B2 * | 1/2006 | Luo | 381/313 |
| 7,020,290 B1 | 3/2006 | Ribic | |
| 7,224,385 B2 * | 5/2007 | Shinada | 348/207.99 |

(Continued)

FOREIGN PATENT DOCUMENTS

| | | | |
|---|---|---|---|
| EP | 1432280 | A2 | 6/2004 |
| EP | 1439526 | A2 | 7/2004 |
| EP | 1494500 | A2 | 1/2005 |
| WO | 2010051606 | A1 | 5/2010 |

OTHER PUBLICATIONS

Patent Cooperation Treaty, "PCT Search Report and Written Opinion of the International Searching Authority" for International Application No. PCT/US2011/041145, Oct. 27, 2011, 10 pages.

*Primary Examiner* — Vivian Chin
*Assistant Examiner* — Ammar Hamid
(74) *Attorney, Agent, or Firm* — Ingrassia Fisher & Lorenz, PC; Erin P. Madill; Sylvia Chen

(57) ABSTRACT

At least two microphones generate wideband electrical audio signals in response to incoming sound waves, and the wideband audio signals are filtered to generate low band signals and high band signals. From the low band signals, low band beamformed signals are generated, and the low band beamformed signals are combined with the high band signals to generate modified wideband audio signals. In one implementation, an electronic apparatus is provided that includes a microphone array, a crossover, a beamformer module, and a combiner module. The microphone array has at least two pressure microphones that generate wideband electrical audio signals in response to incoming sound waves. The crossover generates low band signals and high band signals from the wideband electrical audio signals. The beamformer module generates low band beamformed signals from the low band signals. The combiner module combines the high band signals and the low band beamformed signals to generate modified wideband audio signals.

17 Claims, 19 Drawing Sheets

(56) References Cited

U.S. PATENT DOCUMENTS

| | | | | |
|---|---|---|---|---|
| 7,359,520 | B2 | 4/2008 | Brennan et al. | |
| 7,580,540 | B2 | 8/2009 | Zurek et al. | |
| 7,587,054 | B2 | 9/2009 | Elko et al. | |
| 8,275,162 | B2 * | 9/2012 | Bauml et al. | 381/313 |
| 2005/0080616 | A1 | 4/2005 | Leung et al. | |
| 2006/0140417 | A1 | 6/2006 | Zurek | |
| 2006/0204022 | A1 * | 9/2006 | Hooley et al. | 381/117 |
| 2006/0269080 | A1 | 11/2006 | Oxford et al. | |
| 2008/0170718 | A1 | 7/2008 | Faller | |
| 2009/0010453 | A1 | 1/2009 | Zurek et al. | |
| 2010/0110232 | A1 | 5/2010 | Zhang et al. | |

* cited by examiner

ELECTRONIC APPARATUS FOR GENERATING MODIFIED WIDEBAND AUDIO SIGNALS BASED ON TWO OR MORE WIDEBAND MICROPHONE SIGNALS

TECHNICAL FIELD

The present invention generally relates to portable electronic devices, and more particularly to portable electronic devices having the capability to acquire wideband audio information.

BACKGROUND

Many portable electronic devices today implement multimedia acquisition systems that can be used to acquire audio and video information. Many such devices include audio and video recording functionality that allow them to operate as handheld, portable audio-video (AV) systems. Examples of portable electronic devices that have such capability include, for example, digital wireless cellular phones and other types of wireless communication devices, digital video cameras, etc.

Some portable electronic devices include one or more microphones mounted in the portable electronic device. These microphones can be used to acquire and/or record audio information from an operator of the device and/or from a subject that is being recorded. It is desirable to be able acquire and/or record a spatial audio signal across a full or entire audio frequency bandwidth.

Beamforming generally refers to audio signal processing techniques that can be used to spatially process and filter sound waves received by an array of microphones to achieve a narrower response in a desired direction. Beamforming can be used to change the directionality of a microphone array so that audio signals generated from different microphones can be combined. Beamforming enables a particular pattern of sound to be preferentially observed to allow for acquisition of an audio signal-of-interest and the exclusion of audio signals that are outside the directional beam pattern.

When applied to portable electronic devices, however, physical limitations or constraints can limit the effectiveness of classical multi-microphone beamforming techniques. The physical structure of a portable electronic device can restrict the useable bandwidth of the multimedia acquisition system, and thus prevent it from acquiring a spatial wideband audio signal across the full 20-20K Hz audio bandwidth. Parameters that can restrict the performance or useable bandwidth of a multimedia acquisition system include, for example, physical microphone spacing, port mismatch, frequency response mismatch, and shadowing due to the physical structure that the microphones are mounted in. This is in part because the microphones may be multi-purpose, for example, for multimedia audio signal acquisition, private mode telephone conversation, and speakerphone telephone conversation.

Accordingly, it is desirable to provide improved portable electronic devices having the capability to acquire and/or record a spatial wideband audio signal across a full audio frequency bandwidth. It is also desirable to provide methods and systems within such devices that can allow a portable electronic device to acquire and/or record a spatial wideband audio signal across a full audio frequency bandwidth despite physical limitations of such devices. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1A:
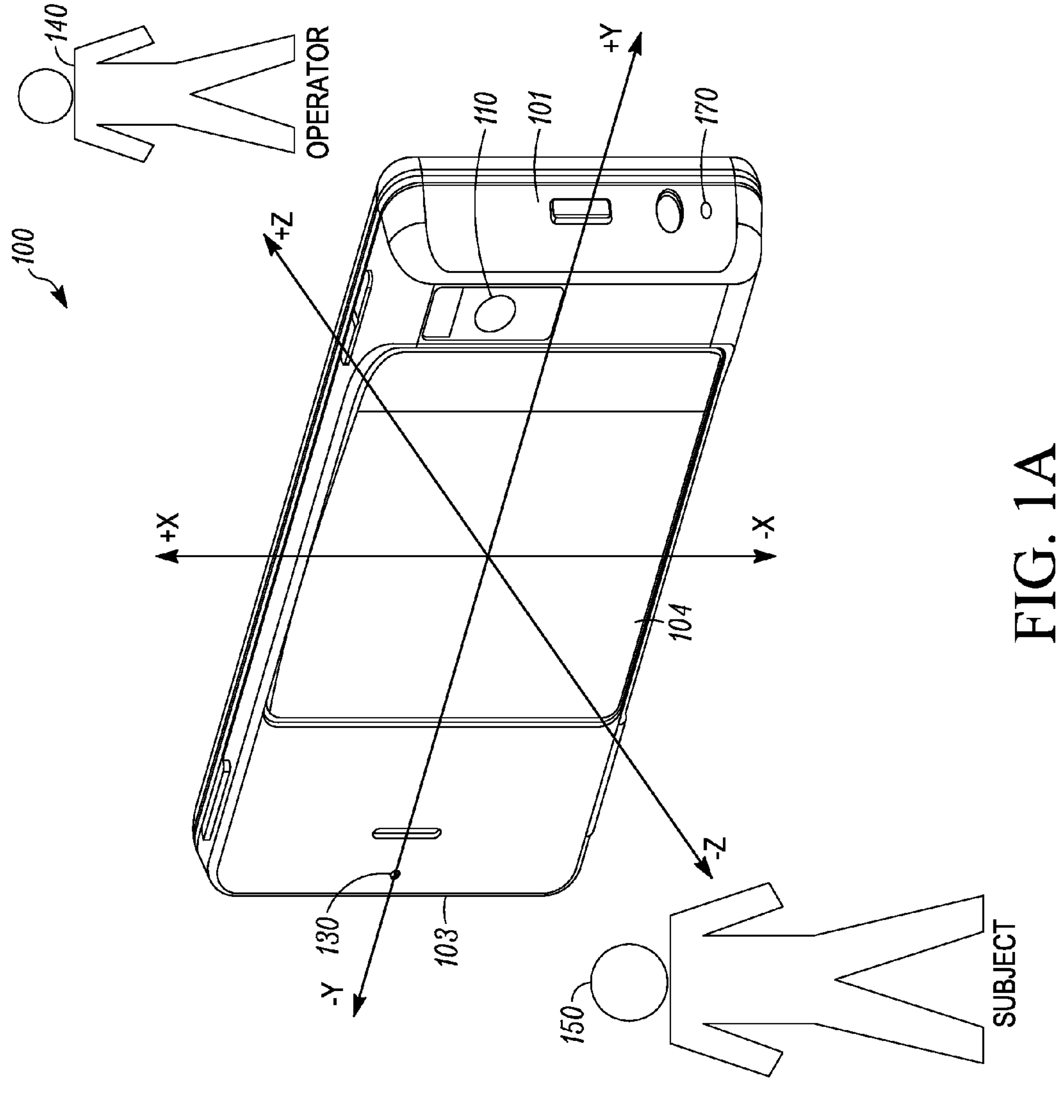
FIG. 1A is a front perspective view of an electronic apparatus in accordance with one exemplary implementation of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in a method for acquiring wideband audio information across a full audio frequency bandwidth of 20-20K Hz. Due to parameters that can restrict the performance or useable bandwidth of the multimedia acquisition system such as physical microphone spacing, port mismatch, frequency response mismatch, and shadowing due to the physical structure that the microphones are mounted in, microphones cannot capture the full audio bandwidth of 20-20K Hz. For example, one microphone is used for speakerphone mode and is generally placed at a distal end where the mouthpiece lies. The result is a device that has microphones placed too far apart to beamform above a frequency which has a wavelength over twice the distance between the two microphones. As such, when microphones are spaced apart by more than half of a wavelength, conventional beamforming techniques can not be used to capture higher frequency components of an audio signal. Additionally microphone resonances can sometimes lie within the multimedia bandwidth. While the majority of the magnitude of these resonances can be flattened (e.g., by placing acoustic resistance in the microphone path), the phase shift due to this resonance will still exist and if the microphones do not all have the same resonance, this phase variance from channel to channel makes beamforming in that region impractical.

In accordance with this method, wideband electrical audio signals are generated in response to incoming sound, and low band signals and high band signals are generated from the wideband electrical audio signals. Low band beamformed signals are generated from the low band signals. The low band beamformed signals are combined with the high band signals to generate modified wideband audio signals.

In one implementation, an electronic apparatus is provided that includes a microphone array, an audio crossover, a beamformer module, and a combiner module. The microphone array includes at least two pressure microphones that generate wideband electrical audio signals in response to incoming sound. As used herein, the term "crossover" refers to a filter bank that splits an incoming electrical audio signal into at least one high band audio signal and at least one low band audio signal. Thus, a crossover can generate a low band signal and a high band signal from a wideband electrical audio signal. If there are multiple input signals, the crossover can generate a low band signal and a high band signal for each incoming audio signal. The beamformer module receives two or more low band signals from the crossover, one for each incoming microphone signal, and generates low band beamformed signals from the low band signals. The combiner module combines the high band signals and the low band beamformed signals to generate modified wideband audio signals.

Figure 1B:
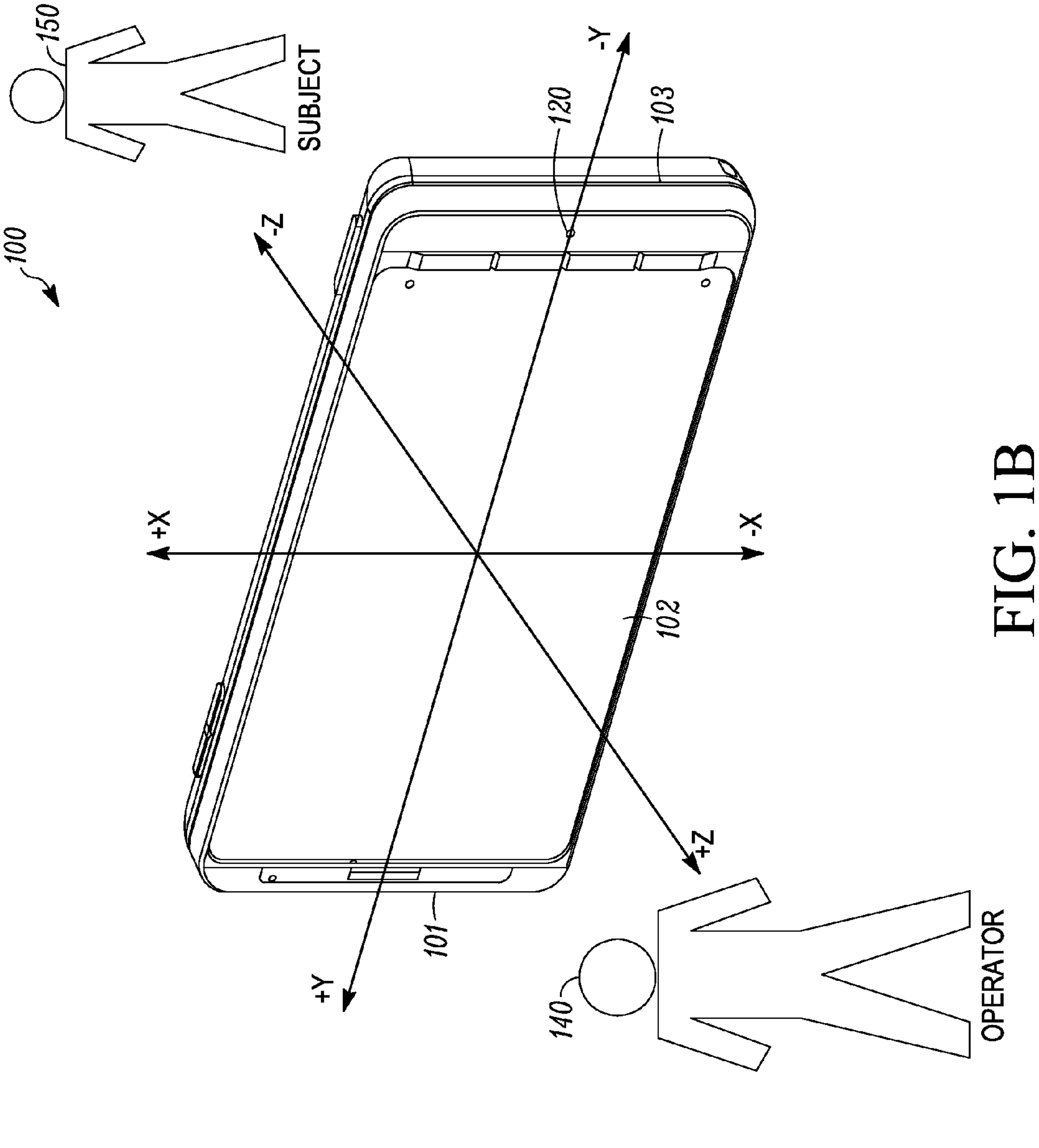
FIG. 1B is a rear perspective view of the electronic apparatus of FIG. 1A.
Figure 2B:
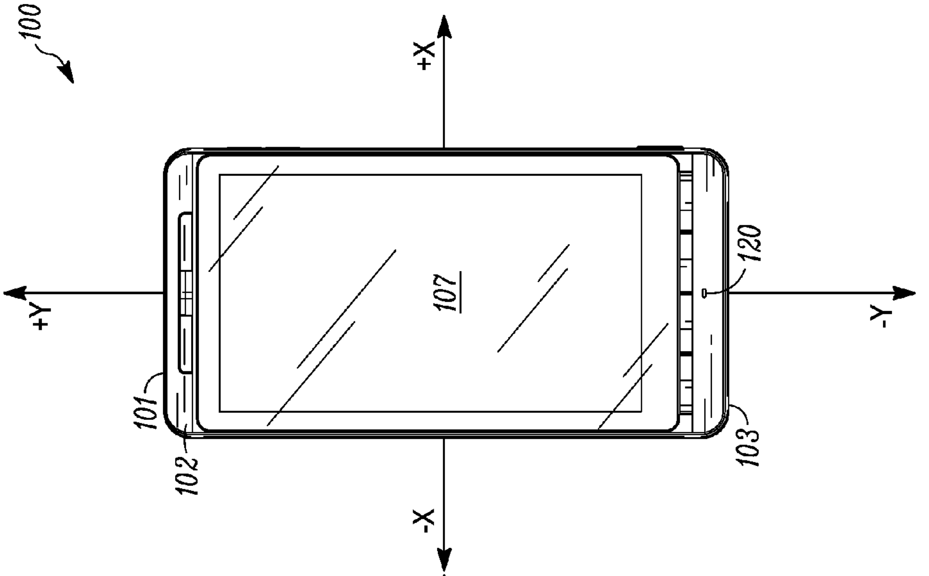
FIG. 2B is a rear view of the electronic apparatus of FIG. 1A.
Figure 2A:
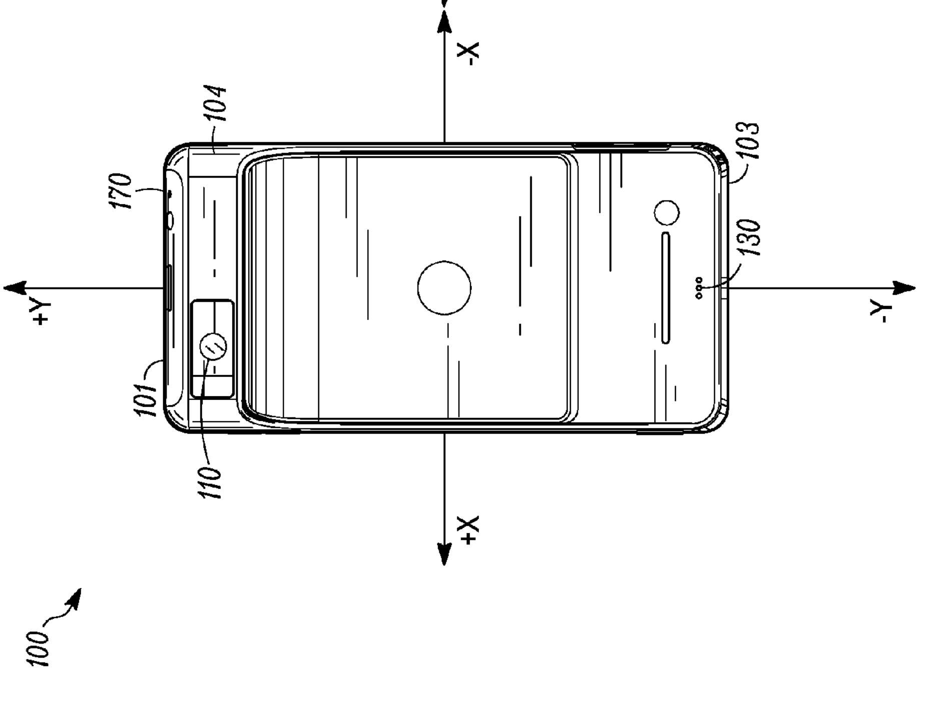
FIG. 2A is a front view of the electronic apparatus of FIG. 1A.

Prior to describing the electronic apparatus with reference to FIGS. 3-12, one example of an electronic apparatus and an operating environment will be described with reference to FIGS. 1A-2B. FIG. 1A is a front perspective view of an electronic apparatus 100 in accordance with one exemplary implementation of the disclosed embodiments. FIG. 1B is a rear perspective view of the electronic apparatus 100. The perspective view in FIGS. 1A and 1B are illustrated with reference to an operator 140 of the electronic apparatus 100 that is audiovisually recording a subject 150. FIG. 2A is a front view of the electronic apparatus 100 and FIG. 2B is a rear view of the electronic apparatus 100.

The electronic apparatus 100 can be any type of electronic apparatus having multimedia recording capability. For example, the electronic apparatus 100 can be any type of portable electronic device with audio/video recording capability including a camcorder, a still camera, a personal media recorder and player, or a portable wireless computing device. As used herein, the term "wireless computing device" refers to any portable computer or other hardware designed to communicate with an infrastructure device over an air interface through a wireless channel. A wireless computing device is "portable" and potentially mobile or "nomadic" meaning that the wireless computing device can physically move around, but at any given time may be mobile or stationary. A wireless computing device can be one of any of a number of types of mobile computing devices, which include without limitation, mobile stations (e.g. cellular telephone handsets, mobile radios, mobile computers, hand-held or laptop devices and personal computers, personal digital assistants (PDAs), or the like), access terminals, subscriber stations, user equipment, or any other devices configured to communicate via wireless communications.

The electronic apparatus 100 has a housing 102, 104, a left-side portion 101, and a right-side portion 103 opposite the left-side portion 101. The housing 102, 104 has a width dimension extending in an y-direction, a length dimension extending in a x-direction, and a thickness dimension extending in a z-direction (into and out of the page). The rear-side is oriented in a +z-direction and the front-side oriented in a −z-direction. Of course, as the electronic apparatus is re-oriented, the designations of "right", "left", "width", and "length" may be changed. The current designations are given for the sake of convenience.

More specifically, the housing includes a rear housing 102 on the operator-side of the apparatus 100, and a front housing 104 on the subject-side of the apparatus 100. The rear housing 102 and front housing 104 are assembled to form an enclosure for various components including a circuit board (not illustrated), an earpiece speaker (not illustrated), an antenna (not illustrated), a video camera 110, and a user interface 107 including microphones 120, 130, 170 that are coupled to the circuit board.

The housing includes a plurality of ports for the video camera 110 and the microphones 120, 130, 170. Specifically, the rear housing 102 includes a first port for a rear-side microphone 120, and the front housing 104 has a second port for a front-side microphone 130. The first port and second port share an axis. The first microphone 120 is disposed along the axis and near the first port of the rear housing 102, and the second microphone 130 is disposed along the axis opposing the first microphone 120 and near the second port of the front housing 104.

Optionally, in some implementations, the front housing 104 of the apparatus 100 includes the third port in the front housing 104 for another microphone 170, and a fourth port for video camera 110. The third microphone 170 is disposed near the third port. The video camera 110 is positioned on the front-side and thus oriented in the same direction as the front housing 104, opposite the operator, to allow for images of the subject to be acquired as the subject is being recorded by the camera. An axis through the first and second ports may align with a center of a video frame of the video camera 110 positioned on the front housing 104.

The left-side portion 101 is defined by and shared between the rear housing 102 and the front housing 104, and oriented in a +y-direction that is substantially perpendicular with respect to the rear housing 102 and the front housing 104. The right-side portion 103 is opposite the left-side portion 101, and is defined by and shared between the rear housing 102 and the front housing 104. The right-side portion 103 is oriented in a −y-direction that is substantially perpendicular with respect to the rear housing 102 and the front housing 104.

Figure 3:
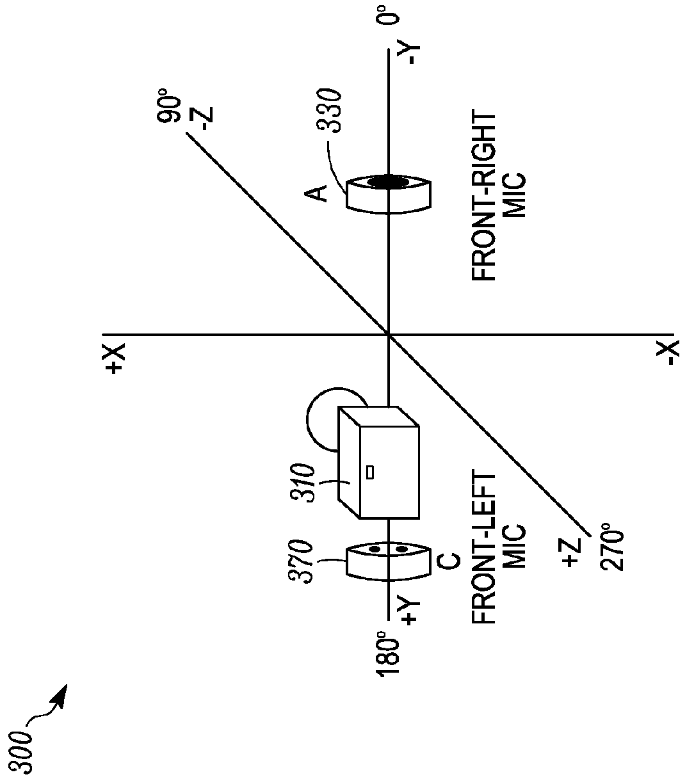
FIG. 3 is a schematic of a microphone and video camera configuration of the electronic apparatus in accordance with some of the disclosed embodiments.

FIG. 3 is a schematic of a microphone and video camera configuration 300 of the electronic apparatus in accordance with some of the disclosed embodiments. The configuration 300 is illustrated with reference to a Cartesian coordinate system and includes the relative locations of a front-side pressure microphone 370 with respect to another front-side pressure microphone 330 and video camera 310. Both physical pressure microphone elements 330, 370 are on the subject or front-side of the electronic apparatus 100. One of the front-side pressure microphones 330 is disposed near a right-side of the electronic apparatus and the other front-side pressure microphone 370 is disposed near the left-side of the electronic apparatus. As described above, the video camera 310 is positioned on a front-side of the electronic apparatus 100 and disposed near the left-side of the electronic apparatus 100. Although described here on the front side of the electronic apparatus 100, the pressure microphones 330 and 370 could alternately be located on both ends of the device.

The front-side pressure microphones 330, 370 are located or oriented opposite each other along a common y-axis, which is oriented along a line at zero and 180 degrees. The z-axis is oriented along a line at 90 and 270 degrees and the x-axis is oriented perpendicular to the y-axis and the z-axis in an upward direction. The front-side pressure microphones 330, 370 are separated by 180 degrees along the y-axis. The camera 310 is also located along the y-axis and points into the page in the −z-direction towards the subject in front of the device.

The front-side pressure microphones 330, 370 can be any known type of pressure microphone elements including electret condenser, MEMS (Microelectromechanical Systems), ceramic, dynamic, or any other equivalent acoustic-to-electric transducer or sensor that converts sound pressure into an electrical audio signal. Pressure microphones are, over much of their operating range, inherently omnidirectional in nature, picking up sound equally from all directions. However, above some frequency, all pressure microphone capsules will tend to exhibit some directionality due to the physical dimensions of the capsule. In one embodiment, the front-side pressure microphones 330, 370 have omnidirectional polar patterns that sense incoming sound more or less equally from all directions over a given frequency band which is less than a full audio bandwidth of 20 Hz to 20 kHz. In one implementation, the front-side pressure microphones 330, 370 can be part of a microphone array that is processed using beamforming techniques, such as delaying and summing (or delaying and differencing), to establish directional patterns based on wideband electrical audio signals generated by the front-side pressure microphones 330, 370.

Figure 4:
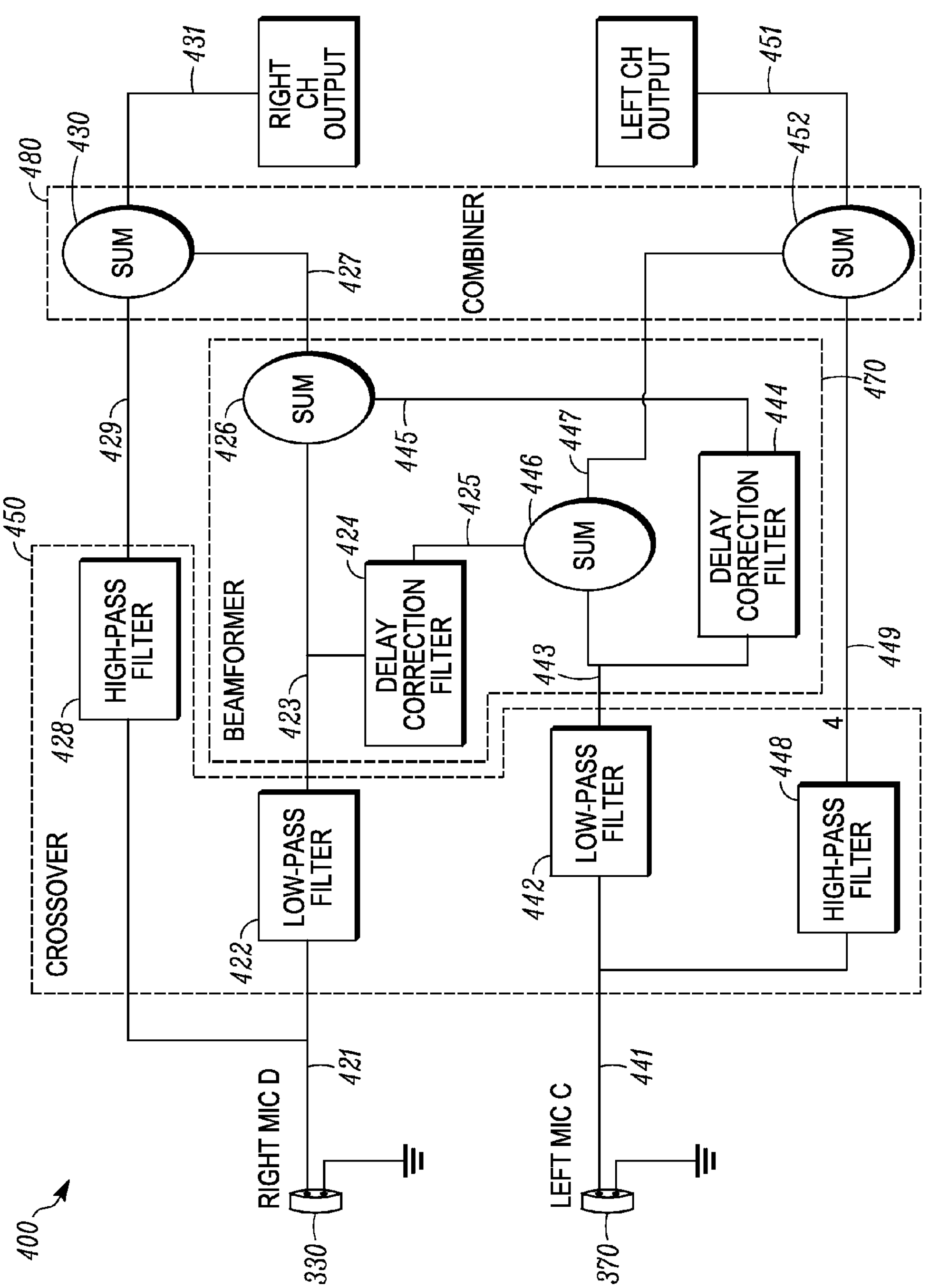
FIG. 4 is a block diagram of an audio acquisition and processing system of an electronic apparatus in accordance with some of the disclosed embodiments.

FIG. 4 is a block diagram of an audio acquisition and processing system 400 of an electronic apparatus in accordance with some of the disclosed embodiments. The audio acquisition and processing system 400 includes a microphone array that includes pressure microphones 330, 370, an audio crossover 450, a beamformer module 470, and a combiner module 480.

Each of the pressure microphones 330, 370 generates a wideband electrical audio signal 421, 441 in response to incoming sound. More specifically, in this embodiment, the first pressure microphone 330 generates a first wideband electrical audio signal 421 in response to incoming sound waves, and the second pressure microphone 370 generates a second wideband electrical audio signal 441 in response to the incoming sound waves. These wideband electrical audio signals are generally a voltage signal that corresponds to a sound pressure captured at the microphones.

The audio crossover 450 generates low band signals 423, 443 and high band signals 429, 449 from the incoming wideband electrical audio signals 421, 441. As used herein, the term "low band signal" refers to lower frequency components of a wideband electrical audio signal, whereas the term "high band signal" refers to higher frequency components of a wideband electrical audio signal. As used herein, the term "lower frequency components" refers to frequency components of a wideband electrical audio signal that are less than a crossover frequency ($f_c$) of the audio crossover 450. As used herein, the term "higher frequency components" refers to frequency components of a wideband electrical audio signal that are greater than or equal to the crossover frequency ($f_c$) of the audio crossover 450.

More specifically, in this embodiment, the crossover 450 includes a first low-pass filter 422, a first high-pass filter 428, a second low-pass filter 442, and a second high-pass filter 448. The first low-pass filter 422 generates a first low band signal 423 with low frequency components of the first wideband electrical audio signal 421, and the second low-pass filter 442 generates a second low band signal 443 with low frequency components of the second wideband electrical audio signal 441. Each low-pass filter filters or passes low-frequency band signals but attenuates (reduces the amplitude of) signals with frequencies higher than the cutoff frequency (i.e., the frequency characterizing a boundary between a passband and a stopband). This way, low pass filtering removes the high band frequencies that cannot be properly beamformed. This results in good acoustic imaging in the low band.

To provide acoustic imaging in the high band, the first high-pass filter 428 generates a first high band signal 429 with high frequency components of the first wideband electrical audio signal 421, and the second high-pass filter 448 generates a second high band signal 449 with high frequency components of the second wideband electrical audio signal 441. Each high-pass filter passes high frequencies and attenuates (i.e., reduces the amplitude of) frequencies lower than the filter's cutoff frequency, which is referred to as a crossover frequency ($f_c$) herein. In a first embodiment, the high frequency acoustic imaging is the result of the physical spacing between the microphones, which adds appropriate inter-aural time delay between the right and left audio channels, and/or the change of the pressure microphone elements from omni-directional in nature to directional in nature at these higher frequencies.

It will be appreciated by those skilled in the art that the low-pass and high-pass filters used in this particular implementation of the crossover 450 are not limiting, and that other equivalent filter bank configurations could be used to implement the crossover 450 such that it produces the same or very similar outputs based on the wideband electrical audio signals 421, 441.

In one implementation, the low band signals 423, 443 produced by the low-pass filters 422, 442 are omnidirectional, and the high band signals 429, 449 produced by the high-pass filters 428, 448 are not omnidirectional. This change in directivity of the microphone signal can be caused by the incoming acoustic wavelength approaching the size of the microphone capsule or ports, or it can be due to the shadowing effects that the physical size and shape of the device housing 102, 104 create on the microphones mounted therein. At low frequencies, the wavelength of the incoming acoustic waves are much larger than the microphone, port, and housing geometries. As an incoming acoustic signal increases in frequency, the wavelength decreases in size. Due to this reduction in wavelength as the frequency increases, the physical size of the housing, ports, and microphone element have more effect on the incoming acoustic wave as the frequency increases. The more the housing affects the incoming acoustic wave, the more directional the microphone system becomes.

When the distance between the microphones 330, 370 is greater than approximately a half wavelength ($\lambda/2$) of the acoustic signals being captured by those microphones 330, 370, the inventors observed that beamform processing of high frequency components of the wideband electrical audio signals can be inaccurate. In other words, processing of a wideband electrical audio signal can be inaccurate over its full wide bandwidth dependent upon microphone placement within a physical device. Accordingly, the crossover frequency ($f_c$) of the audio crossover 450 is selected to split the full audio frequency band (into high and low frequency bands) at the point where classical beamforming starts to break down. In some embodiments, the crossover frequency ($f_c$) of the audio crossover 450 is determined, at least in part, based on a distance between the two pressure microphones 330, 370. In some implementations, the crossover frequency ($f_c$) of the crossover 450 is determined such that the high band signals 429, 449 include the first resonance of the ported pressure microphone systems. Near this resonance, slight differences in the phase of the two microphones 330, 370 can cause degradation in the beamforming. In some implementations, the crossover frequency ($f_c$) of the audio crossover 450 is determined at a point where the ported microphone system's directivity changes from largely omnidirectional to being directional in nature. Since accurate beamforming relies on the omnidirectional characteristics of each microphone, when a microphone begins to depart from this omnidirectional nature, the beamforming will begin to degrade.

The beamformer module 470 is designed to generate low band beamformed signals 427, 447 from the low band signals 423, 443. More specifically, in this embodiment, the beamformer module 470 includes a first correction filter 424, a second correction filter 444, a first summer module 426, and a second summer module 446.

The first correction filter 424 corrects phase delay in the first low band signal 423 to generate a first low-band delayed signal 425, and the second correction filter 444 corrects phase delay in the second low band signal 443 to generate a second low band delayed signal 445. For instance, in one implementation, the correction filters 424, 444 add a phase delay to the corresponding low band signals 423, 443 to generate the corresponding low-band signals 425, 445. The correction filters 424, 444 can be implemented in many ways. One implementation of the correction filters will add the correct amount of phase delay to first and second low band signals 423 and 443 so that sound arriving from one direction will be delayed exactly 180 degrees at all low-band frequencies (after being processed by the delay correction filters 424, 444) relative to the second and first low band signals 443, 423 input to the other delay correction filters 444, 424. In this case, for example, the electrical signals 425 and 443 will be 180 degrees different in phase at all low-band frequencies when sound originates from a particular direction relative to the microphone array. In this case the same would be true for signals 445 and 423, and the electrical signals 445 and 423 will be 180 degrees different in phase at all low-band frequencies (when sound originates from a particular direction relative to the microphone array).

The first summer module 426 sums the first low band signal 423 and the second low band delayed signal 445 to generate a first low band beamformed signal 427. Similarly, the second summer module 446 sums the second low band signal 443 and the first low band delayed signal 425 to generate a second low band beamformed signal 447.

As will be described further below with reference to FIGS. 5A and 5B, in one implementation, the first low band beamformed signal 427 is a right-facing first-order directional signal (e.g., cardioid) with desired imaging for the low frequency band (e.g., the pattern of the right low-pass filtered beamformed signal generally is oriented to the right), and the second low band beamformed signal 447 is a left-facing first-order directional signal (e.g., cardioid) with desired imaging for the low frequency band (e.g., the pattern of the left low-pass filtered beamformed signal is oriented to the left—opposite the pattern of the right low-pass filtered beamformed signal). Thus, the incoming wideband electrical audio signals are split into a high band and low band, and beamforming is performed on the low band signals (e.g., for frequencies below the crossover frequency ($f_c$)) but not the high band signals.

The combiner module 480 combines the high band signals 429, 449 and the low band beamformed signals 427, 447 to generate modified wideband audio signals 431, 451. More specifically, in this embodiment, the combiner module 480 includes a first combiner module 430 or summing junction that sums or "linearly combines" the first high band signal 429 and the first low band beamformed signal 427 to generate a first modified wideband audio signal 431 that corresponds to a right channel stereo output. Similarly, the second combiner module 452 or summing junction sums the second high band signal 449 and the second low band beamformed signal 447 to generate a second wideband audio signal 451 that corresponds to a left channel stereo output that is spatially distinct from the right channel stereo output.

As a result, each of the modified wideband audio signals 431, 451 includes a linear combination of the high frequency band components and directional low frequency band components, and has approximately the same bandwidth as the incoming wideband audio signals from the microphones 330, 370. Each of the modified wideband audio signals 431, 451 are shown as separate output channel. Although not illustrated in FIG. 4, in some embodiments, the modified wideband audio signals 431, 451 can be combined into a single audio output data stream that can be transmitted and/or recorded. For instance, the modified wideband audio signals 431, 451 can be stored or transmitted as a single file containing separate stereo coded signals.

Examples of low band beamformed signals generated by the beamformer 470 will now be described with reference to FIGS. 5A and 5B. Preliminarily, it is noted that in all of the polar graphs described below, signal magnitudes are plotted linearly to show the directional (or angular) response of a particular signal. Further, in the examples that follow, for purposes of illustration of one example, it can be assumed that the subject is generally located at approximately 90° while the operator is located at approximately 270°. The directional patterns shown in FIGS. 5A and 5B are slices through the directional response forming a plane as would be observed by a viewer who located above the electronic apparatus 100 of FIG. 1 who is looking downward, where the z-axis in FIG. 3 corresponds to the 90°-270° line, and the y-axis in FIG. 3 corresponds to the 0°-180° line.

Figure 5A:
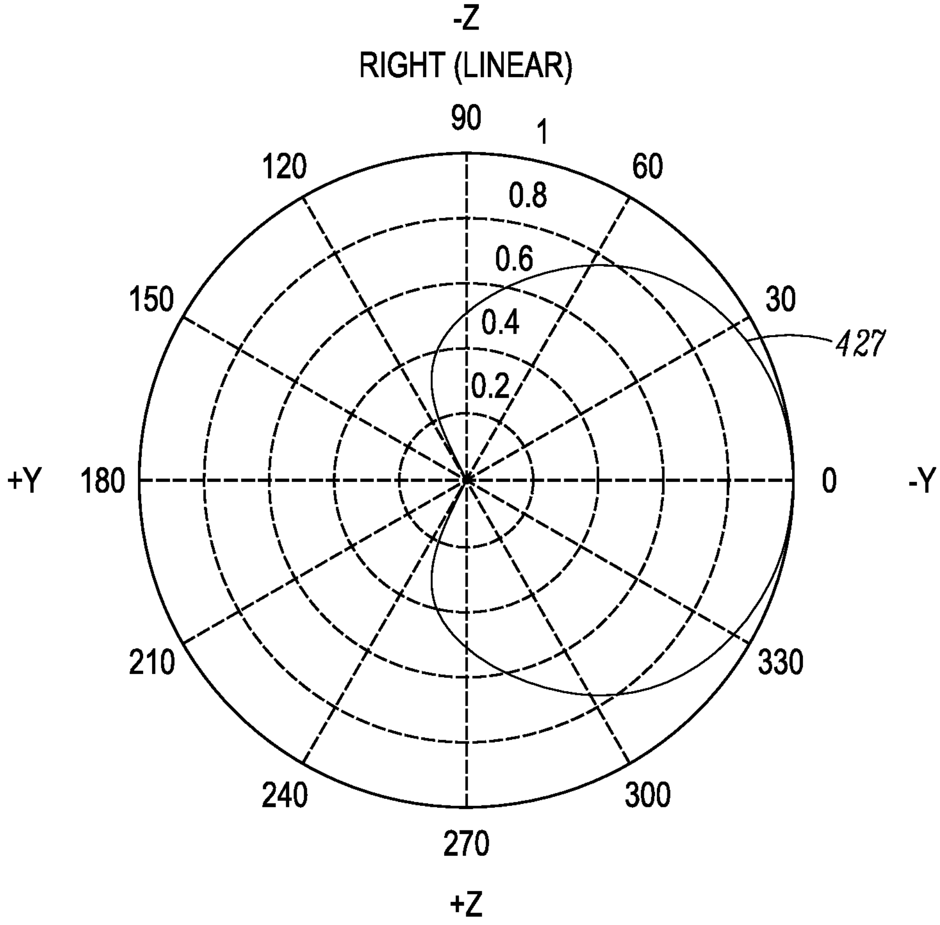
FIG. 5A is an exemplary polar graph of a right-side-oriented low band beamformed signal generated by the audio acquisition and processing system in accordance with one implementation of some of the disclosed embodiments.

FIG. 5A is an exemplary polar graph of a right-side-oriented low band beamformed signal 427 generated by the audio acquisition and processing system 400 in accordance with one implementation of some of the disclosed embodiments. As illustrated in FIG. 5A, the right-side-oriented low band beamformed signal 427 has a first-order cardioid directional pattern that points towards the −y-direction or to the right-side of the apparatus 100. This first-order directional pattern has a maximum at zero degrees and has a relatively strong directional sensitivity to sound originating from the right-side of the apparatus 100. The right-side-oriented low band beamformed signal 427 also has a null at 180 degrees that points towards the left-side of the apparatus 100 (in the +y-direction), which indicates that there is little or no directional sensitivity to sound originating from the left-side of the apparatus 100. Stated differently, the right-side-oriented low band beamformed signal 427 emphasizes sound waves originating from the right of the apparatus 100 and has a null oriented towards the left of the apparatus 100.

Figure 5B:
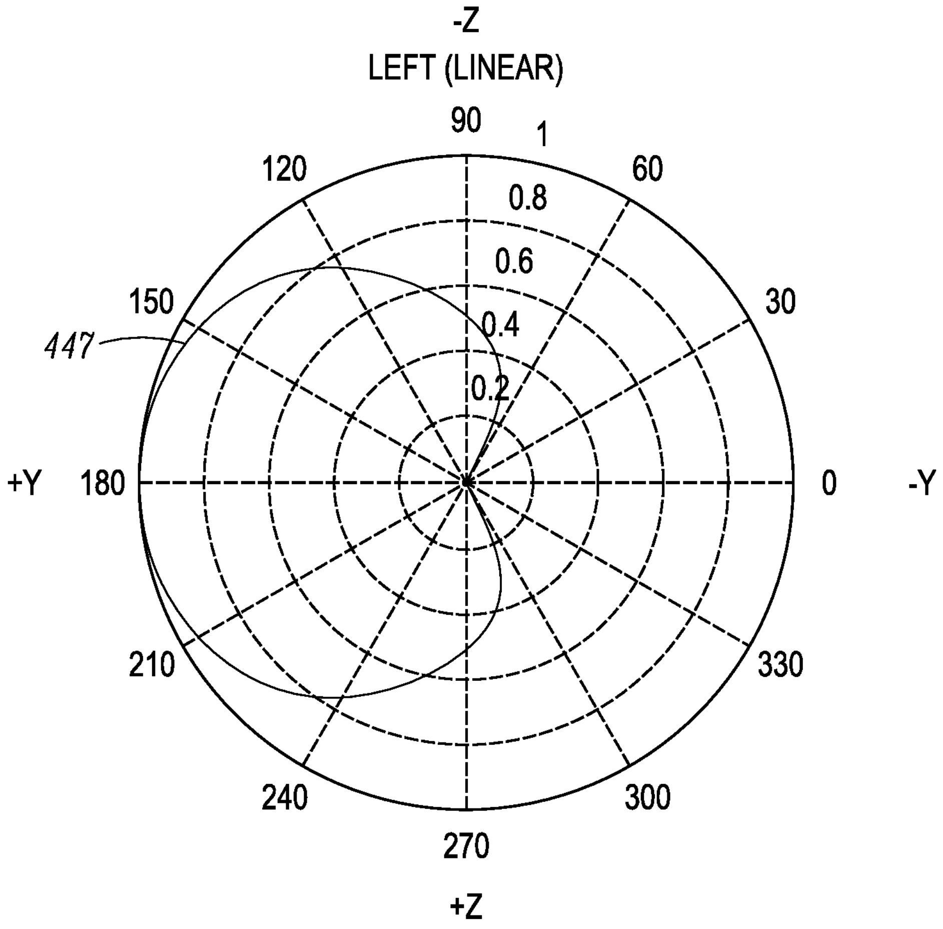
FIG. 5B is an exemplary polar graph of a left-side-oriented low band beamformed signal generated by the audio acquisition and processing system in accordance with one implementation of some of the disclosed embodiments.

FIG. 5B is an exemplary polar graph of a left-side-oriented low band beamformed signal 447 generated by the audio acquisition and processing system 400 in accordance with one implementation of some of the disclosed embodiments. As illustrated in FIG. 5B, the left-side-oriented low band beamformed signal 447 also has a first-order cardioid directional pattern but it points towards the left-side of the apparatus 100 in the +y-direction, and has a maximum at 180 degrees. This indicates that there is strong directional sensitivity to sound originating from the left of the apparatus 100. The left-side-oriented low band beamformed signal 447 also has a null (at 0 degrees) that points towards the right-side of the apparatus 100 (in the −y-direction), which indicates that there is little or no directional sensitivity to sound originating from the right of the apparatus 100. Stated differently, the left-side-oriented low band beamformed signal 447 emphasizes sound waves originating from left of the apparatus 100 and has a null oriented towards the right of the apparatus 100.

Although the low band beamformed signals 427, 447 shown in FIGS. 5A and 5B are both beamformed first order cardioid directional beamform patterns that are either right-side-oriented or left-side-oriented, those skilled in the art will appreciate that the low band beamformed signals 427, 447 are not necessarily limited to having these particular types of first order cardioid directional patterns and that they are shown to illustrate one exemplary implementation. In other words, although the directional patterns are cardioid-shaped, this does not necessarily imply the low band beamformed signals are limited to having a cardioid shape, and may have any other shape that is associated with first order directional beamform patterns such as a dipole, hypercardioid, supercardioid, etc. The directional patterns can range from a nearly cardioid beamform to a nearly bidirectional beamform, or from a nearly cardioid beamform to a nearly omnidirectional beamform. Alternatively a higher order directional beamform could be used in place of the first order directional beamform if other known processing methods are used in the beamformer 470.

Moreover, although the low band beamformed signals 427, 447 are illustrated as having cardioid directional patterns, it will be appreciated by those skilled in the art, that these are mathematically ideal examples only and that, in some practical implementations, these idealized beamform patterns will not necessarily be achieved.

Thus, in the embodiment of FIG. 4, the first low band beamformed signal 427 that corresponds to a right virtual microphone has a maximum located along the 0 degree axis, and the second low band beamformed signal 447 that corresponds to a left virtual microphone has a maximum located along the 180 degree axis.

In some implementations, it would be desirable to change the angular locations of these maxima off the +y and −y axes. One such implementation will now be described with reference to FIGS. 6-8B.

Figure 6:
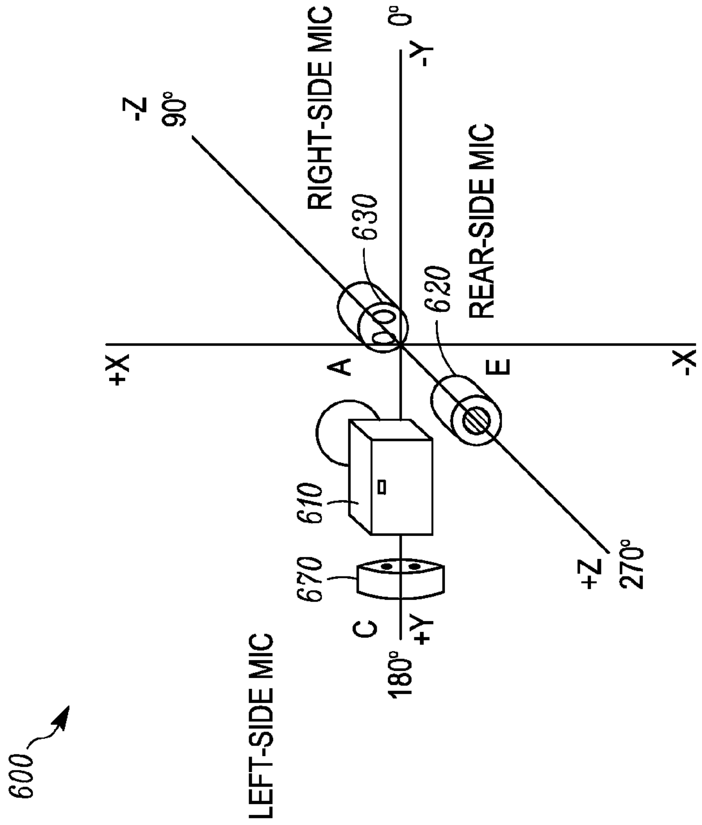
FIG. 6 is a schematic of a microphone and video camera configuration of the electronic apparatus in accordance with some of the other disclosed embodiments.

FIG. 6 is a schematic of a microphone and video camera configuration 600 of the electronic apparatus in accordance with some of the other disclosed embodiments. As with FIG. 3, the configuration 600 is illustrated with reference to a Cartesian coordinate system in which the x-axis is oriented in an upward direction that is perpendicular to both the y-axis and the z-axis. In FIG. 6, the relative locations of a rear-side pressure microphone 620, a right-side pressure microphone 630, a left-side pressure microphone 670, and a front-side video camera 610 are shown.

In this embodiment, the right and rear pressure microphones 620, 630 are along a common z-axis and separated by 180 degrees along a line at 90 degrees and 270 degrees. The left-side and right-side pressure microphones 670, 630 are located along a common y-axis. The rear pressure microphone element 620 is on an operator-side of portable electronic apparatus 100 in this embodiment. Of course, if the camera were configured differently (e.g., in a webcam configuration), the third microphone element 620 might be considered on the front side. As mentioned previously, the relative directions of left, right, front, and rear are provided merely for the sake of simplicity and may change depending on the physical implementation of the device.

While the configuration of the microphones shown in FIG. 6 is represented as a right triangle existing in a horizontal plane, in application the microphones can be configured in any orientation that creates a triangle when projected onto a horizontal plane. For example the rear microphone 620 does not necessarily have to lie directly behind the right-side microphone 630 or left-side microphone 670, but could be behind and somewhere between the right-side microphone 630 and left-side microphone 670.

The pressure microphone elements 630, 670 are on the subject or front-side of the electronic apparatus 100. One front-side pressure microphone 630 is disposed near a right-side of the electronic apparatus 100 and the other front-side pressure microphone 670 is disposed near the left-side of the electronic apparatus 100.

As described above, the video camera 610 is positioned on a front-side of the electronic apparatus 100 and disposed near the left-side of the electronic apparatus 100. The video camera 610 is also located along the y-axis and points into the page in the −z-direction towards the subject in front of the device (as does the pressure microphone 630). The subject (not shown) would be located in front of the front-side pressure microphone 630, and the operator (not shown) would be located behind the rear-side pressure microphone 620. This way the pressure microphones are oriented such that they can capture audio signals or sound from subjects being recorded by the video camera 610 and as well as from the operator taking the video or any other source behind the electronic apparatus 100.

As in FIG. 3, the physical pressure microphones 620, 630, 670 described herein can be any known type of physical pressure microphone elements including electret condenser, MEMS (Microelectromechanical Systems), ceramic, dynamic, or any other equivalent acoustic-to-electric transducer or sensor that converts sound pressure into an electrical audio signal. The physical pressure microphones 620, 630, 670 can be part of a microphone array that is processed using beamforming techniques such as delaying and summing (or delaying and differencing) to establish directional patterns based on outputs generated by the physical pressure microphones 620, 630, 670.

As will now be described with reference to FIGS. 7-8B and 9-11, because the three microphones allow for directional patterns to be created at any angle in the yz-plane, the left and right front-side virtual microphone elements along with the rear-side virtual microphone elements can allow for wideband stereo or surround sound recordings to be created over the full audio frequency bandwidth of 20 Hz to 20 kHz.

Figure 7:
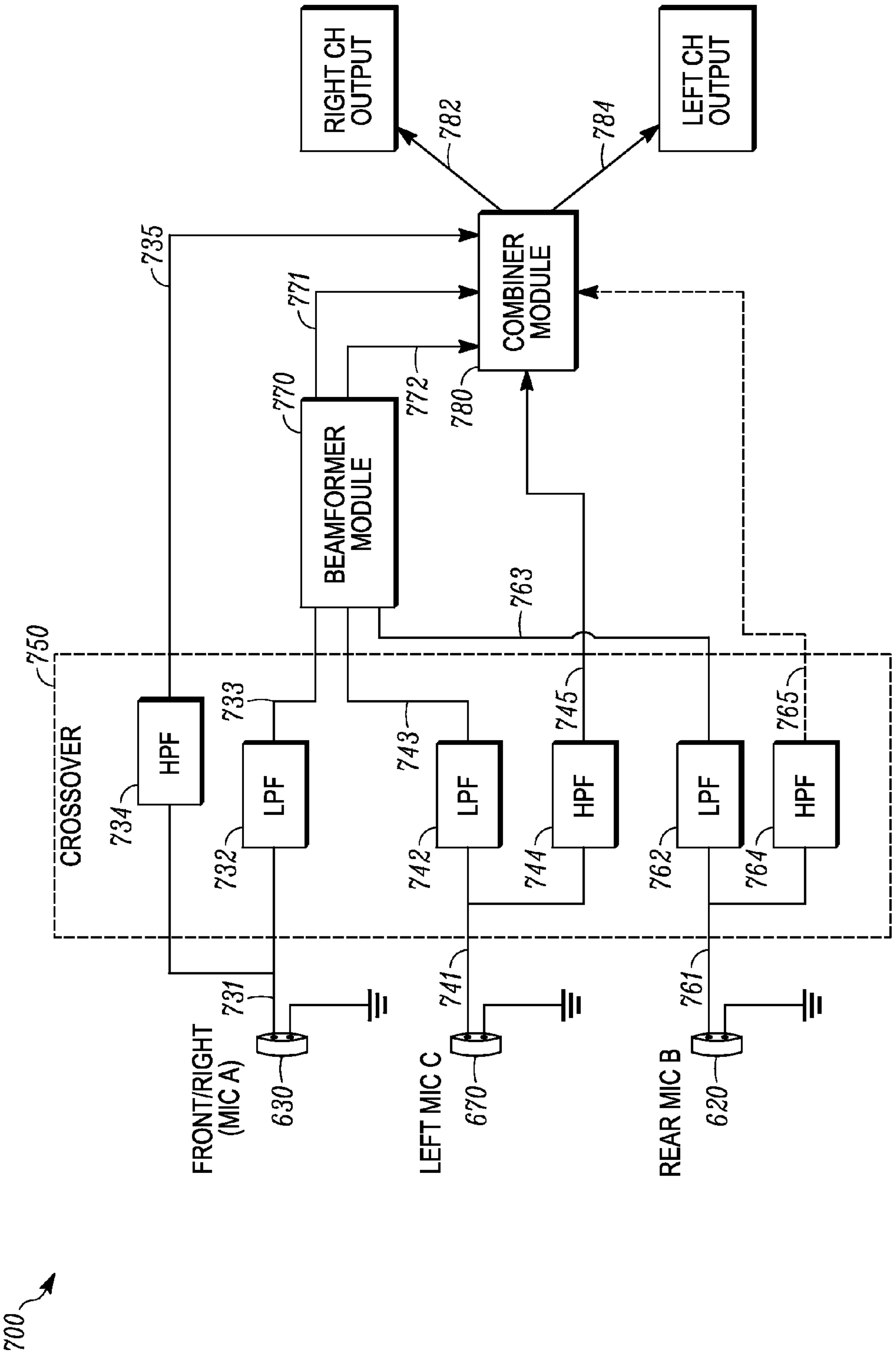
FIG. 7 is a block diagram of an audio acquisition and processing system of an electronic apparatus in accordance with some of the disclosed embodiments.

FIG. 7 is a block diagram of an audio acquisition and processing system 700 of an electronic apparatus in accordance with some of the disclosed embodiments. This embodiment differs from FIG. 4 in that the system 700 includes an additional pressure microphone 620. In this embodiment, the microphone array includes a first pressure microphone 630 that generates a first wideband electrical audio signal 731 in response to incoming sound, a second pressure microphone 670 that generates a second wideband electrical audio signal 741 in response to the incoming sound, and a third pressure microphone 620 that generates a third wideband electrical audio signal 761 in response to the incoming sound.

This embodiment also differs from FIG. 4 in that the audio crossover 750 includes additional filtering to process the three wideband electrical audio signals 761, 731, 741 generated by the three microphones 620, 630, 670, respectively. In particular, the crossover 750 includes a first low-pass filtering module 732, a first high-pass filtering module 734, a second low-pass filtering module 742, a second high-pass filtering module 744, a third low-pass filtering module 762, and a third high-pass filtering module 764.

The first low-pass filtering module 732 generates a first low band signal 733 that includes low frequency components of the first wideband electrical audio signal 731, the second low-pass filtering module 742 generates a second low band signal 743 that includes low frequency components of the second wideband electrical audio signal 741, and the third low-pass filtering module 762 generates a third low band signal 763 that includes low frequency components of the third wideband electrical audio signal 761.

The first high-pass filtering module 734 generates a first high band signal 735 that includes high frequency components of the first wideband electrical audio signal 731, the second high-pass filtering module 744 generates a second high band signal 745 that includes high frequency components of the second wideband electrical audio signal 741, and the third high-pass filtering module 764 generates a third high band signal 765 that includes high frequency components of the third wideband electrical audio signal 761.

In addition, this embodiment also differs from FIG. 4 in that the beamformer module 770 generates low band beamformed signals 771, 772 based on three input signals: the first low band signal 733, the second low band signal 743, and the third low band signal 763. In this embodiment, three low band signals 733, 743, 763 are required to produce two low band beamformed signals 771, 772 each having directional beam patterns that are at an angle to the y-axis. For example, in one embodiment, the beamformer module 770 generates a right low band beamformed signal 771 based on an un-delayed version of the first low band signal 733 from the right microphone 630, a delayed version of the second low band signal 743 from the left microphone 670, and a delayed version of the third low band signal 763 from the rear microphone 620, and generates a left low band beamformed signal 772 based on a delayed version of the first low band signal 733 from the right microphone 630, an un-delayed version of the second low band signal 743 from the left microphone 670, and a delayed version of the third low band signal 763 from the rear microphone 620. The beamform processing performed by the beamformer module 770 can be delay and sum processing, delay and difference processing, or any other known beamform processing technique for generating directional patterns based on microphone input signals. Techniques for generating such first order beamforms are well-known in the art and will not be described herein.

One implementation of the beamformer module 770 creates orthogonal virtual gradient microphones and then uses a weighted sum to create the two resulting beamformed signals.

For example, a first virtual gradient microphone would be created along the −z-axis of FIG. 6 by applying the process described in beamformer 470 of FIG. 4. In this case, the input signals used would be those from the front-right microphone 630 and the rear microphone 620. A second virtual gradient microphone would be created along the +y-axis of FIG. 6 by applying the process described in beamformer 470 of FIG. 4, but this time the input signals used would be those from the front right microphone 630 and the front left microphone 670. The first and second virtual microphones (one oriented along the −z axis, and one along the +y axis) would then be combined using a weighting factor to create the two low band beamformed signals 771, 772 each having directional beam patterns that are at an angle to the y-axis.

Figure 8A:
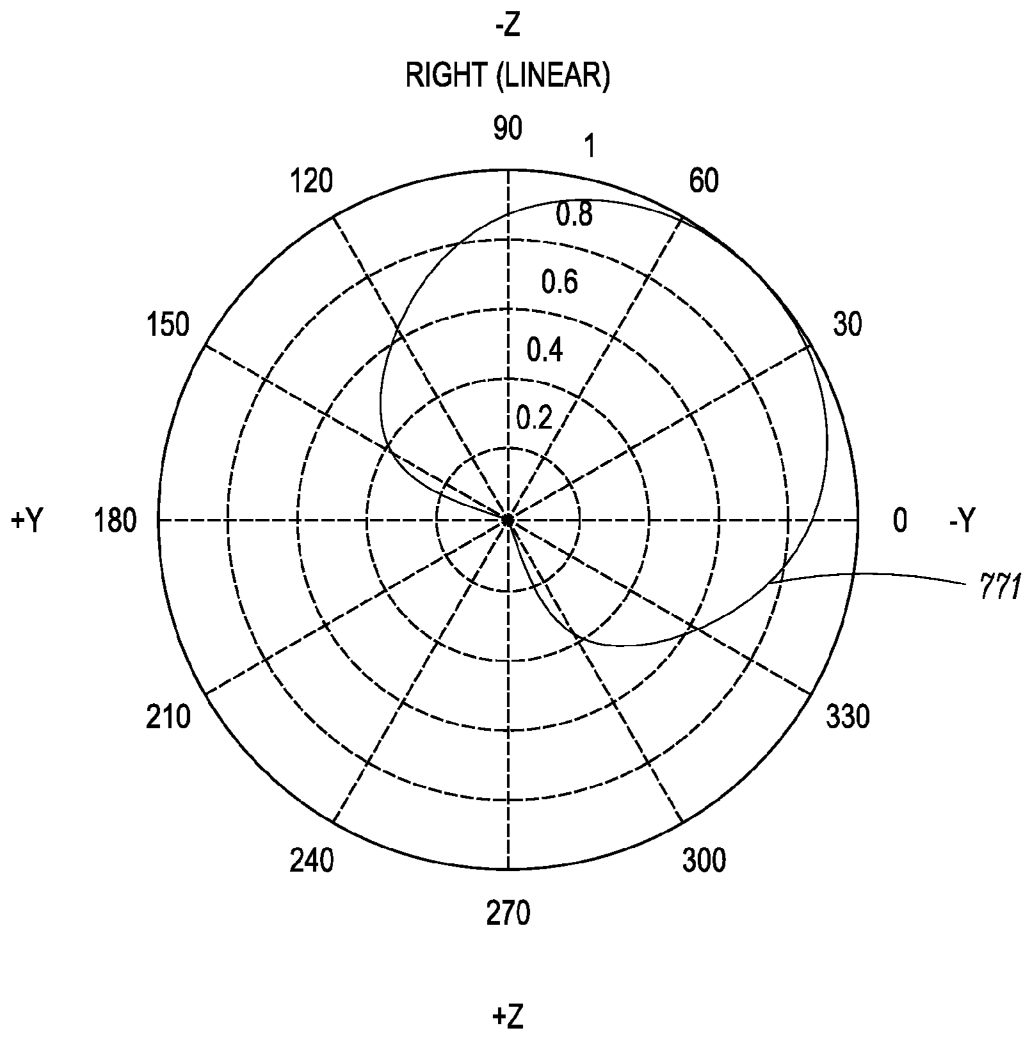
FIG. 8A is an exemplary polar graph of a front-right-side-oriented low band beamformed signal generated by the audio acquisition and processing system in accordance with one implementation of some of the disclosed embodiments.
Figure 8B:
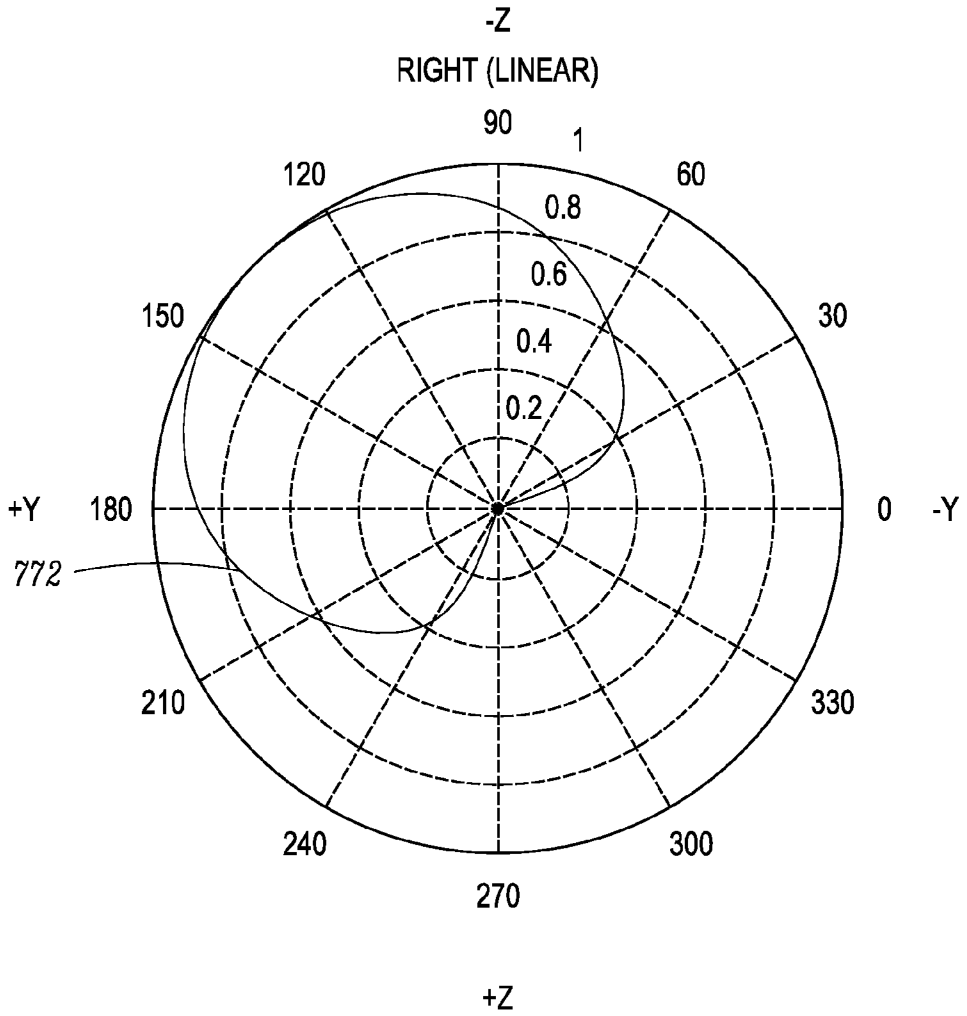
FIG. 8B is an exemplary polar graph of a front-left-side-oriented low band beamformed signal generated by the audio acquisition and processing system in accordance with one implementation of some of the disclosed embodiments.

For instance, to create the first low band beamformed signal 771, the signal of the virtual microphone oriented along the +y axis would be subtracted from the signal of the virtual microphone oriented along the −z-axis. This would result in a virtual microphone signal that would have a pattern oriented 45 degrees off of the y-axis as shown in FIG. 8A. In this case the coefficients used in the weighted sum would be −1 for the +y-axis oriented signal and +1 for the −z-axis oriented signal. By contrast, to create the second low band beamformed signal 772, the signal of the virtual microphone oriented along the +y-axis would be added to the signal of the virtual microphone oriented along the −z-axis. This would result in a virtual microphone signal that would have a pattern oriented 45 degrees off of the y axis as shown in FIG. 8B. In this case the coefficients used in the weighted sum would be +1 for the +y-axis oriented signal and +1 for the −z-axis oriented signal.

A second implementation of the beamformer module 770 would combine the two step process described above using a single set of equations in a lookup table that would generate the same results.

The first high band signal 735 and the second high band signal 745 are passed to the combiner module 780 without altering either signal. The physical distance between the microphones provides enough difference in the right and left signals to provide adequate spatial imaging for the high frequency band. The third high band signal 765, corresponding to the rear pressure microphone 620, is not passed through to the combiner module 780 since only right and left high band signals are required for a stereo output. In this two-channel (stereo output) implementation, the high pass filter 764 could be eliminated to save memory and processing in the device. If a rear output channel were desired, the third high band signal 765 would be passed through to the combiner module 780 to be combined with a third low band beamformed signal oriented in the +z direction (not shown).

The combiner module 780 then mixes the first and second low band beamformed signal 771, 772 and the first and second high band signals 735, 745 to generate a first modified wideband audio signal 782 that corresponds to a right channel stereo output signal, and a second modified wideband audio signal 784 that corresponds to a left channel stereo output signal. In one implementation, the combiner module 780 linearly combines the first low band beamformed signal 771 with its corresponding first high band signal 735 to generate the first modified wideband audio signal 782, and linearly combines the second low band beamformed signal 772 with its corresponding second high band signal 745 to generate the second modified wideband audio signal 784. Any processing delay in the low band beamformed signals 771, 772 created by the beamforming process would be corrected in this combiner module 780 by adding the appropriate delay to the high band signals 735, 745 resulting in a synchronization of the low and high band signals prior to combination.

As will be explained further below with reference to FIGS. 8A and 8B, inclusion of an additional pressure microphone 670 allows the beamformer 770 to generate low band beamformed signals 771, 772 having directional patterns that are oriented at an angle with respect to the y-axis.

Examples of low band beamformed signals 771, 772 will now be described with reference to FIGS. 8A and 8B. Similar to the other example graphs above, the directional patterns shown in FIGS. 8A and 8B are a horizontal planar representation of the directional response as would be observed by a viewer who is located above the electronic apparatus 100 of FIG. 1 and looking downward, where the z-axis in FIG. 6 corresponds to the 90°-270° line, and the y-axis in FIG. 6 corresponds to the 0°-180° line.

FIG. 8A is an exemplary polar graph of a front-right-side-oriented low band beamformed signal 771 generated by the audio acquisition and processing system 700 in accordance with one implementation of some of the disclosed embodiments. As illustrated in FIG. 8A, the front-right-side-oriented low band beamformed signal 771 has a first-order cardioid directional pattern that points towards the front-right-side of the apparatus 100 at an angle between the −y-direction and −z-direction. This particular first-order directional pattern has a maximum at 45 degrees and has a relatively strong directional sensitivity to sound originating from sources to the front-right-side of the apparatus 100. The front-right-side-oriented low band beamformed signal 771 also has a null at 225 degrees that points towards the rear-left-side of the apparatus 100 (an angle between the +z direction and the +y-direction), which indicates that there is lessened directional sensitivity to sound originating from the rear-left-side of the apparatus 100. Stated differently, the front-right-side-oriented low band beamformed signal 771 emphasizes sound waves emanating from sources to the front-right-side of the apparatus 100 and has a null oriented towards the rear-left-side of the apparatus 100.

FIG. 8B is an exemplary polar graph of a front-left-side-oriented low band beamformed signal 772 generated by the audio acquisition and processing system 700 in accordance with one implementation of some of the disclosed embodiments. As illustrated in FIG. 8B, the front-left-side-oriented low band beamformed signal 772 has a first-order cardioid directional pattern that points towards the front-left-side of the apparatus 100 at an angle between the +y-direction and −z-direction. This particular first-order directional pattern has a maximum at 135 degrees and has a relatively strong directional sensitivity to sound originating from sources to the front-left-side of the apparatus 100. The front-left-side-oriented low band beamformed signal 772 also has a null at 315 degrees that points towards the rear-right-side of the apparatus 100 (an angle between the +z direction and the −y-direction), which indicates that there is lessened directional sensitivity to sound originating from sources to the rear-right-side of the apparatus 100. Stated differently, the front-left-side-oriented low band beamformed signal 772 emphasizes sound waves emanating from sources to the front-left-side of the apparatus 100 and has a null oriented towards the rear-right-side of the apparatus 100.

Although the low band beamformed signals 771, 772 shown in FIGS. 8A and 8B are both first order cardioid directional beamform patterns that are either front-right-side-oriented or front-left-side-oriented, those skilled in the art will appreciate that the low band beamformed signals 771, 772 are not necessarily limited to having these particular types of first order cardioid directional patterns and that they are shown to illustrate one exemplary implementation. In other words, although the directional patterns are cardioid-shaped, this does not necessarily imply the low band beamformed signals are limited to having a cardioid shape, and may have any other shape that is associated with first order directional beamform patterns such as a dipole, hypercardioid, supercardioid, etc. The directional patterns can range from a nearly cardioid beamform to a nearly bidirectional beamform, or from a nearly cardioid beamform to a nearly omnidirectional beamform. Alternatively a higher order directional beamform could be used in place of the first order directional beamform.

Moreover, although the low band beamformed signals 771, 772 are illustrated as having cardioid directional patterns, it will be appreciated by those skilled in the art, that these are mathematically ideal examples only and that, in some practical implementations, these idealized beamform patterns will not necessarily be achieved.

In addition, it is noted that the specific examples in FIGS. 8A and 8B illustrate that the front-right-side-oriented low band beamformed signal 771 (that contributes to the right virtual microphone) has a maximum located along the 45 degree axis, and that the front-left-side-oriented low band beamformed signal 772 (that contributes to the left virtual microphone) has a maximum located along the 135 degree axis. However, those skilled in the art will appreciate that the directional patterns of the low band beamformed signals 771, 772 can be steered to other angles based on standard beamforming techniques such that angular locations of the maxima can be manipulated. For example, in FIG. 8A, the directional pattern of the first low band beamformed signal 771 (that contributes to the right virtual microphone) can be oriented towards the front-right-side at any angle between 0 and 90 degrees with respect to the −y-axis (at zero degrees). Likewise, in FIG. 8B, the directional pattern of the second low band beamformed signal 772 (that contributes to the left virtual microphone) can be oriented towards the front-left-side at any angle between 90 and 180 degrees with respect to the +y-axis (at 180 degrees).

Figure 9:
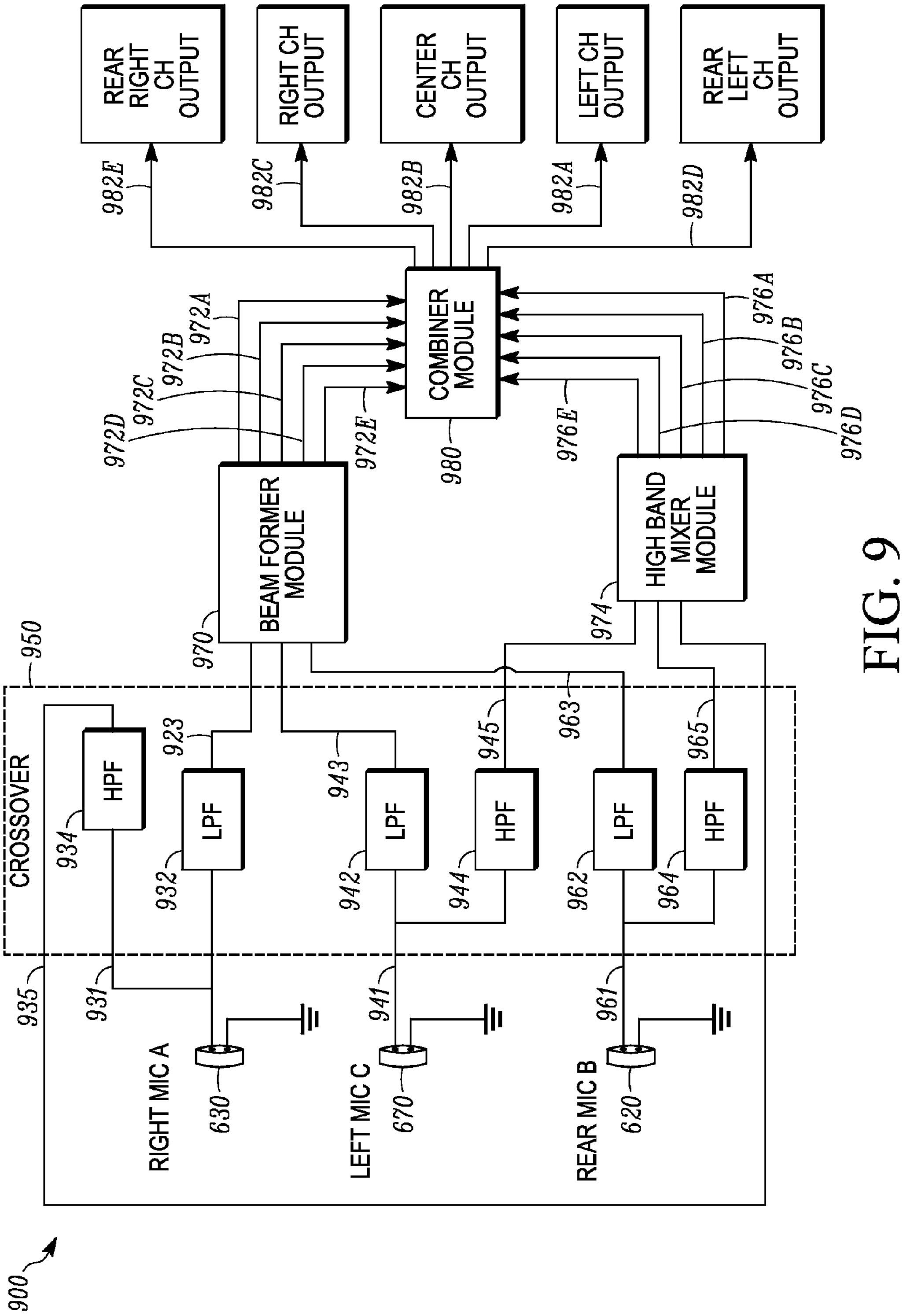
FIG. 9 is a block diagram of an audio acquisition and processing system of an electronic apparatus in accordance with some of the other disclosed embodiments.

FIG. 9 is a block diagram of an audio acquisition and processing system 900 of an electronic apparatus in accordance with some of the other disclosed embodiments. Instead of a two channel stereo output as shown in FIG. 7, this audio acquisition and processing system 900 uses the wideband signals from three microphones 620, 630, 670 to produce a five-channel surround sound output. FIG. 9 is similar to FIG. 7 and so the common features of FIG. 9 will not be described again for sake of brevity.

The beamformer module 970 generates a plurality of low band beamformed signals 972A, 972B, 972C, 972D, 972E based on the first low band signal 923, the second low band signal 943, and the third low band signal 963. The low band beamformed signals include a front-left low band beamformed signal 972A, a front center low band beamformed signal 972B, a front-right low band beamformed signal 972C, a rear-left low band beamformed signal 972D, and a rear-right low band beamformed signal 972E. As will be described further below with reference to FIGS. 10A-E, the low band beamformed signals 972A-972E have polar directivity pattern plots with main lobes oriented to the front-left 972A, the front-center 972B, the front-right 972C, the rear-left 972D, and the rear-right 972E. These low band beamformed signals 972A-972E could be created in the beamformer module 970 in the same way that the low band beamformed signals 771, 772 were created by beamformer module 770 in the previous example. To produce beamforms oriented in the +z direction a negative coefficient would be applied to the −z axis signal.

This embodiment differs from FIG. 7 in that the system 900 includes a high band audio mixer module 974 for selectively combining/mixing the first high band signal 935, the second high band signal 945, and the third high band signal 965 to mix the high band signals from the microphones to generate additional channels comprising a plurality of multi-channel high band non-beamformed signals 976A-976E. The plurality of multi-channel high band non-beamformed signals 976A-976E include a front-left-side non-beamformed signal 976A, a front-center non-beamformed signal 976B, a front-right-side non-beamformed signal 976C, a rear-left-side non-beamformed signal 976D, and a rear-right-side non-beamformed signal 976E.

In one embodiment, the high band signals 935, 965, 945 are mixed per Table 1, where A, B, and C represent the high band signals 935, 965, 945 from microphones 630, 620, and 670, respectively.

In this table, L is the front-left-side non-beamformed signal 976A contributing to a left channel output, center is the front-center non-beamformed signal 976B contributing to a center channel output, R is the front-right-side non-beamformed signal 976C contributing to a right channel output, and RL is the rear-left-side non-beamformed signal 976D contributing to a rear-left channel output. RR is the rear-right-side non-beamformed signal 976E contributing to a rear-right channel output. Constant gains used in the mixing are represented by m, n, and p. One skilled in the art will realize that in this implementation, high band audio mixer module 974 is creating outputs in a manner similar to simple analog matrix surround signals.

TABLE 1

| OUTPUT | MIX |
|---|---|
| CENTER | (A + C)/2 |
| R | A |
| L | C |
| RR | (mA + nB)/p |
| RL | (mC + nB)/p |

The combiner module 980 is designed to mix each channel of the plurality of low band beamformed signals 972A-972E with its corresponding multi-channel high band non-beamformed signals 976A-976E to form full bandwidth output signals. In response, the combiner module 980 generates a plurality of wideband multi-channel audio signals 982A-982E including a front left-side channel output 982A, a front center channel output 982B, a front right-side channel output 982C, a rear left-side channel output 982D, and a rear right-side channel output 982E. The plurality of wideband multi-channel audio signals 982A-982E corresponds to full wideband surround sound channels. Although not illustrated in FIG. 9, the wideband multi-channel audio signals 982A-982E can be combined into single sound data stream, which can be transmitted and/or recorded.

Examples of low band beamformed signals 972 will now be described with reference to FIGS. 10A-10E. Similar to the other example graphs above, the directional patterns shown in FIGS. 10A-10E are a horizontal planar representation of the directional response as would be observed by a viewer who is located above the electronic apparatus 100 of FIG. 1 and looking downward, where the z-axis in FIG. 6 corresponds to the 90°-270° line, and the y-axis in FIG. 6 corresponds to the 0°-180° line.

Figure 10A:
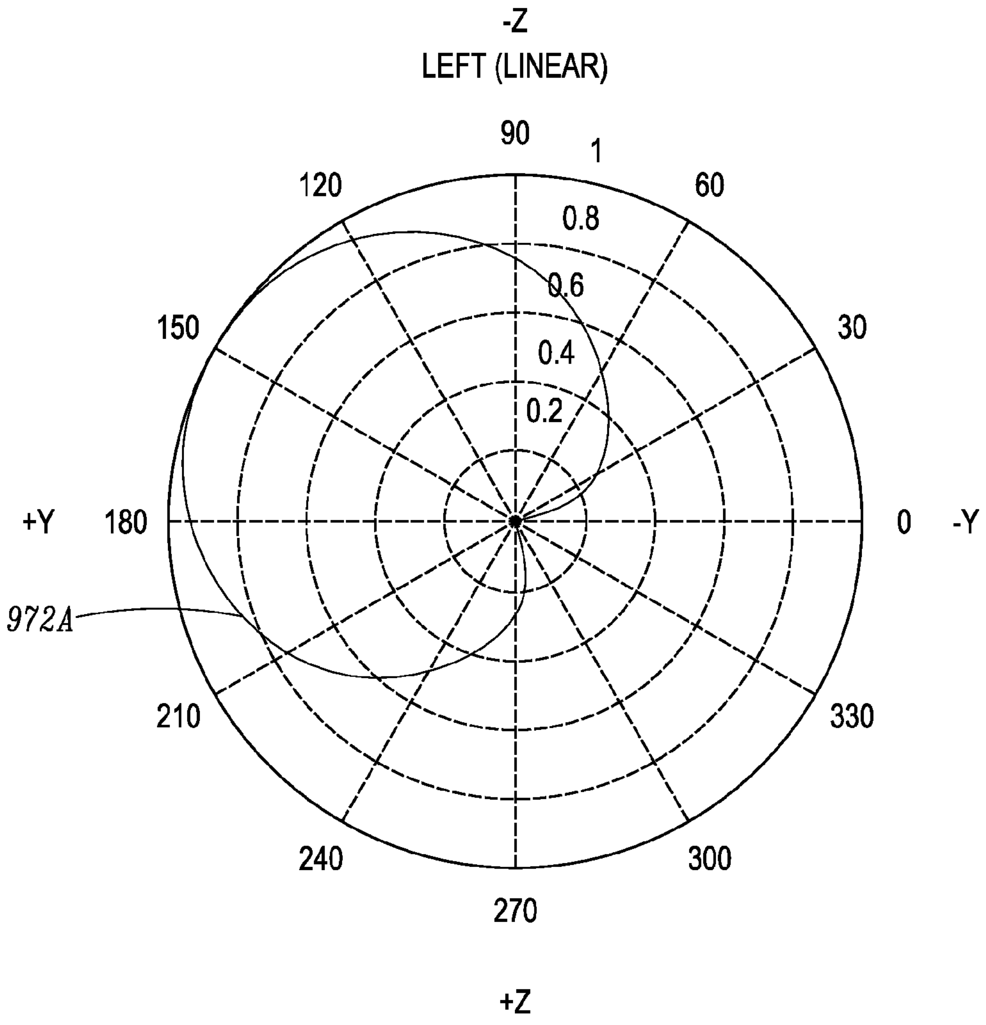
FIG. 10A is an exemplary polar graph of a front left-side low band beamformed signal generated by the audio acquisition and processing system in accordance with one implementation of some of the disclosed embodiments.

FIG. 10A is an exemplary polar graph of a front-left-side low band beamformed signal 972A generated by the audio acquisition and processing system 900 in accordance with one implementation of some of the disclosed embodiments. As illustrated in FIG. 10A, the front-left-side low band beamformed signal 972A has a first-order cardioid directional pattern that is oriented (or points towards) the front-left-side of the apparatus 100 at an angle between the +y-direction and −z-direction. This particular first-order directional pattern has a maximum at 150 degrees and has a relatively strong directional sensitivity to sound originating from sources to the front-left-side of the apparatus 100. The front-left-side low band beamformed signal 972A also has a null at 330 degrees that points towards the rear-right-side of the apparatus 100 (an angle between the +z direction and the −y-direction), which indicates that there is lessened directional sensitivity to sound originating from the rear-right-side of the apparatus 100. Stated differently, the front-left-side low band beamformed signal 972A emphasizes sound waves emanating from sources to the front-left-side of the apparatus 100 and has a null oriented towards the rear-right-side of the apparatus 100.

Figure 10B:
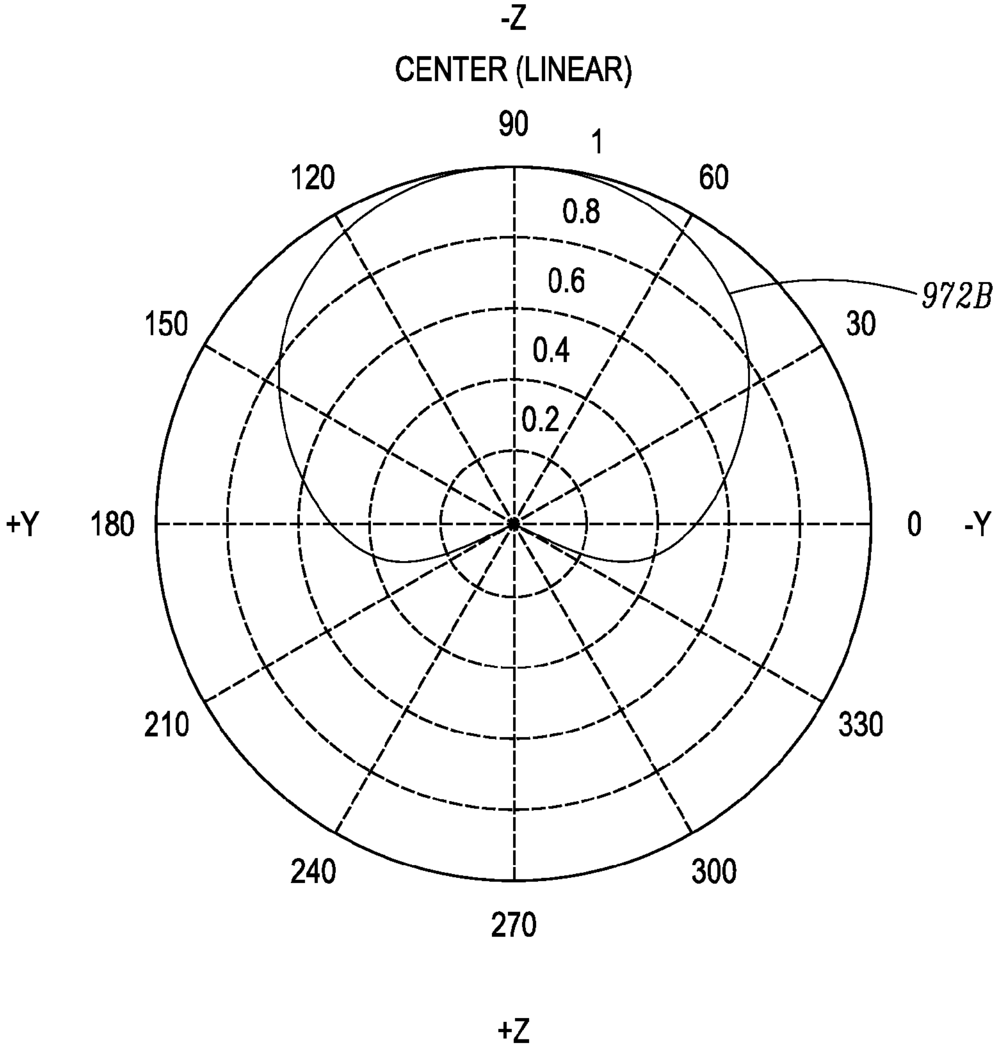
FIG. 10B is an exemplary polar graph of a front center low band beamformed signal generated by the audio acquisition and processing system in accordance with one implementation of some of the disclosed embodiments.

FIG. 10B is an exemplary polar graph of a front-center low band beamformed signal 972B generated by the audio acquisition and processing system 900 in accordance with one implementation of some of the disclosed embodiments. As illustrated in FIG. 10B, the front-center low band beamformed signal 972B has a first-order cardioid directional pattern that is oriented (or points towards) the front-center of the apparatus 100 in the −z-direction. This particular first-order directional pattern has a maximum at 90 degrees and has a relatively strong directional sensitivity to sound originating from sources to the front-center of the apparatus 100. The front-center low band beamformed signal 972B also has a null at 270 degrees that points towards the rear-side of the apparatus 100, which indicates that there is lessened directional sensitivity to sound originating from sources to the rear-side of the apparatus 100. Stated differently, the front-center low band beamformed signal 972B emphasizes sound waves emanating from sources to the front-center of the apparatus 100 and has a null oriented towards the rear-side of the apparatus 100.

Figure 10C:
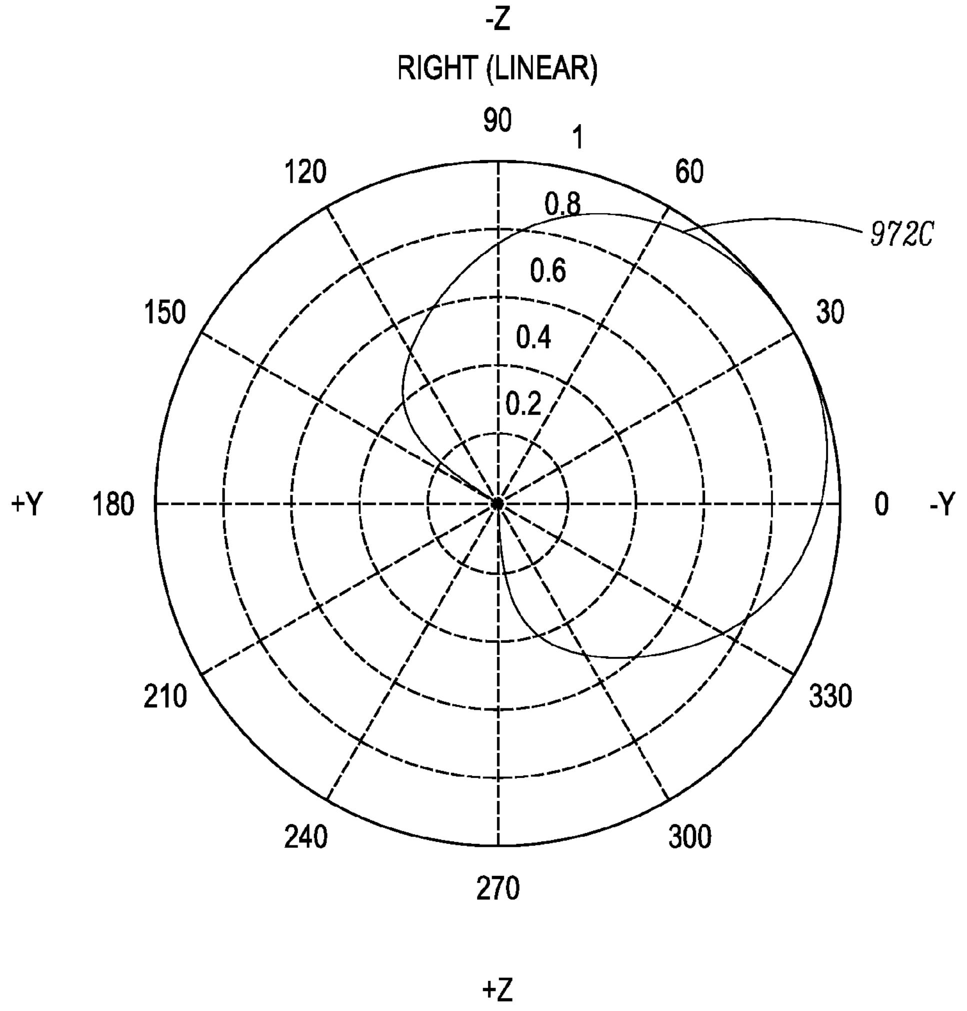
FIG. 10C is an exemplary polar graph of a front right-side low band beamformed signal generated by the audio acquisition and processing system in accordance with one implementation of some of the disclosed embodiments.

FIG. 10C is an exemplary polar graph of a front-right-side low band beamformed signal 972C generated by the audio acquisition and processing system 900 in accordance with one implementation of some of the disclosed embodiments. As illustrated in FIG. 10C, the front-right-side low band beamformed signal 972C has a first-order cardioid directional pattern that is oriented (or points towards) the front-right-side of the apparatus 100 at an angle between the −y-direction and −z-direction. This particular first-order directional pattern has a maximum at 30 degrees and has a relatively strong directional sensitivity to sound originating from sources to the front-right-side of the apparatus 100. The front-right-side low band beamformed signal 972C also has a null at 210 degrees that points towards the rear-left-side of the apparatus 100 (an angle between the +z direction and the +y-direction), which indicates that there is lessened directional sensitivity to sound originating from sources to the rear-left-side of the apparatus 100. Stated differently, the front-right-side low band beamformed signal 972C emphasizes sound waves emanating from sources to the front-right-side of the apparatus 100 and has a null oriented towards the rear-left-side of the apparatus 100.

Figure 10D:
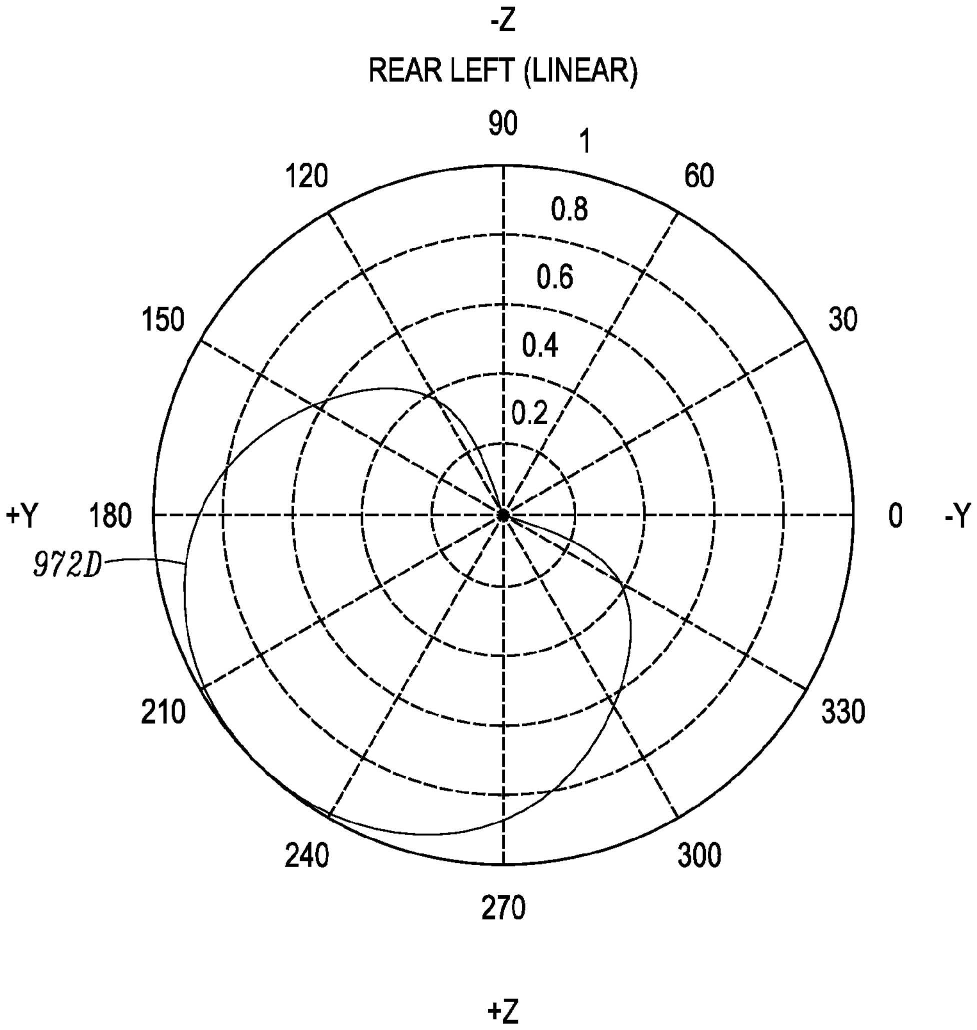
FIG. 10D is an exemplary polar graph of a rear left-side low band beamformed signal generated by the audio acquisition and processing system in accordance with one implementation of some of the disclosed embodiments.

FIG. 10D is an exemplary polar graph of a rear-left-side low band beamformed signal 972D generated by the audio acquisition and processing system 900 in accordance with one implementation of some of the disclosed embodiments. As illustrated in FIG. 10D, the rear-left-side low band beamformed signal 972D has a first-order cardioid directional pattern that is oriented (or points towards) the rear-left-side of the apparatus 100 at an angle between the +y-direction and +z-direction. This particular first-order directional pattern has a maximum at 225 degrees and has a relatively strong directional sensitivity to sound originating from sources to the rear-left-side of the apparatus 100. The rear-left-side low band beamformed signal 972D also has a null at 45 degrees that points towards the front-right-side of the apparatus 100 (an angle between the −z direction and the −y-direction), which indicates that there is lessened directional sensitivity to sound originating from sources to the front-right-side of the apparatus 100. Stated differently, the rear-left-side low band beamformed signal 972D emphasizes sound waves emanating from sources to the rear-left-side of the apparatus 100 and has a null oriented towards the front-right-side of the apparatus 100.

Figure 10E:
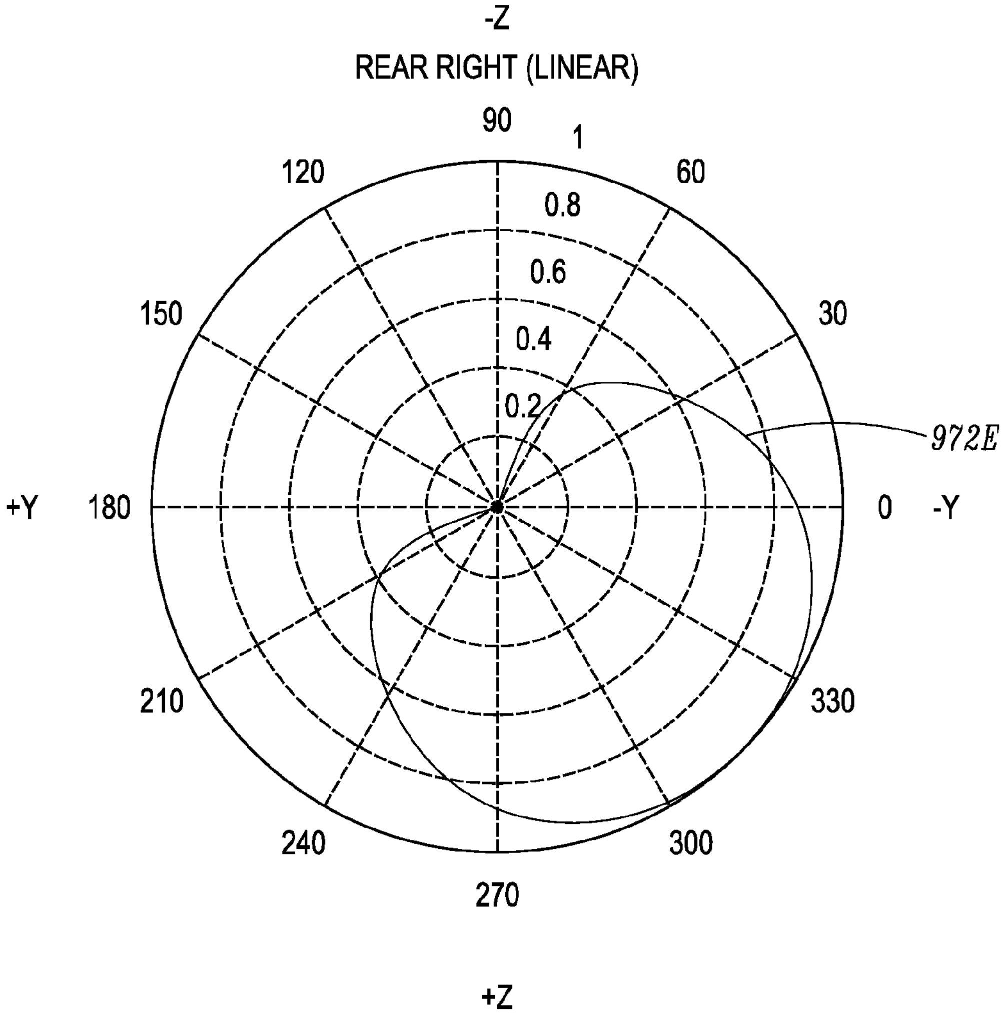
FIG. 10E is an exemplary polar graph of a rear right-side low band beamformed signal generated by the audio acquisition and processing system in accordance with one implementation of some of the disclosed embodiments.

FIG. 10E is an exemplary polar graph of a rear-right-side low band beamformed signal 972E generated by the audio acquisition and processing system 900 in accordance with one implementation of some of the disclosed embodiments. As illustrated in FIG. 10A, the rear-right-side low band beamformed signal 972E has a first-order cardioid directional pattern that is oriented (or points towards) the rear-right-side of the apparatus 100 at an angle between the −y-direction and +z-direction. This particular first-order directional pattern has a maximum at 315 degrees and has a relatively strong directional sensitivity to sound originating from sources to the rear-right-side of the apparatus 100. The rear-right-side low band beamformed signal 972E also has a null at 135 degrees that points towards the front-left-side of the apparatus 100 (an angle between the −z direction and the +y-direction), which indicates that there is lessened directional sensitivity to sound originating from sources to the front-left-side of the apparatus 100. Stated differently, the rear-right-side low band beamformed signal 972E emphasizes sound waves emanating from sources to the rear-right-side of the apparatus 100 and has a null oriented towards the front-left-side of the apparatus 100.

Although the low band beamformed signals 972A-972E shown in FIG. 10A through 10E are first-order cardioid directional beamform patterns, those skilled in the art will appreciate that the low band beamformed signals 972A-972E are not necessarily limited to having these particular types of first-order cardioid directional patterns and that they are shown to illustrate one exemplary implementation. In other words, although the directional patterns shown are cardioid-shaped, this does not necessarily imply the low band beamformed signals are limited to having a cardioid shape, and may have any other shape that is associated with first-order directional beamform patterns such as a dipole, hypercardioid, supercardioid, etc. The directional patterns can range from a nearly cardioid beamform to a nearly bidirectional beamform, or from a nearly cardioid beamform to a nearly omnidirectional beamform. Alternatively a higher order directional beamform could be used in place of the first order directional beamform.

Moreover, although the low band beamformed signals 972A-972E are illustrated as having cardioid directional patterns, it will be appreciated by those skilled in the art, that these are mathematically ideal examples only and that, in some practical implementations, these idealized beamform patterns will not necessarily be achieved.

In addition, it is noted that while the specific examples of the low band beamformed signals 972A-972E each have a maximum located at a particular angle, those skilled in the art will appreciate that the directional patterns of the low band beamformed signals 972A-972E can be steered to other angles based on standard beamforming techniques such that angular locations of the maxima can be manipulated.

Figure 11:
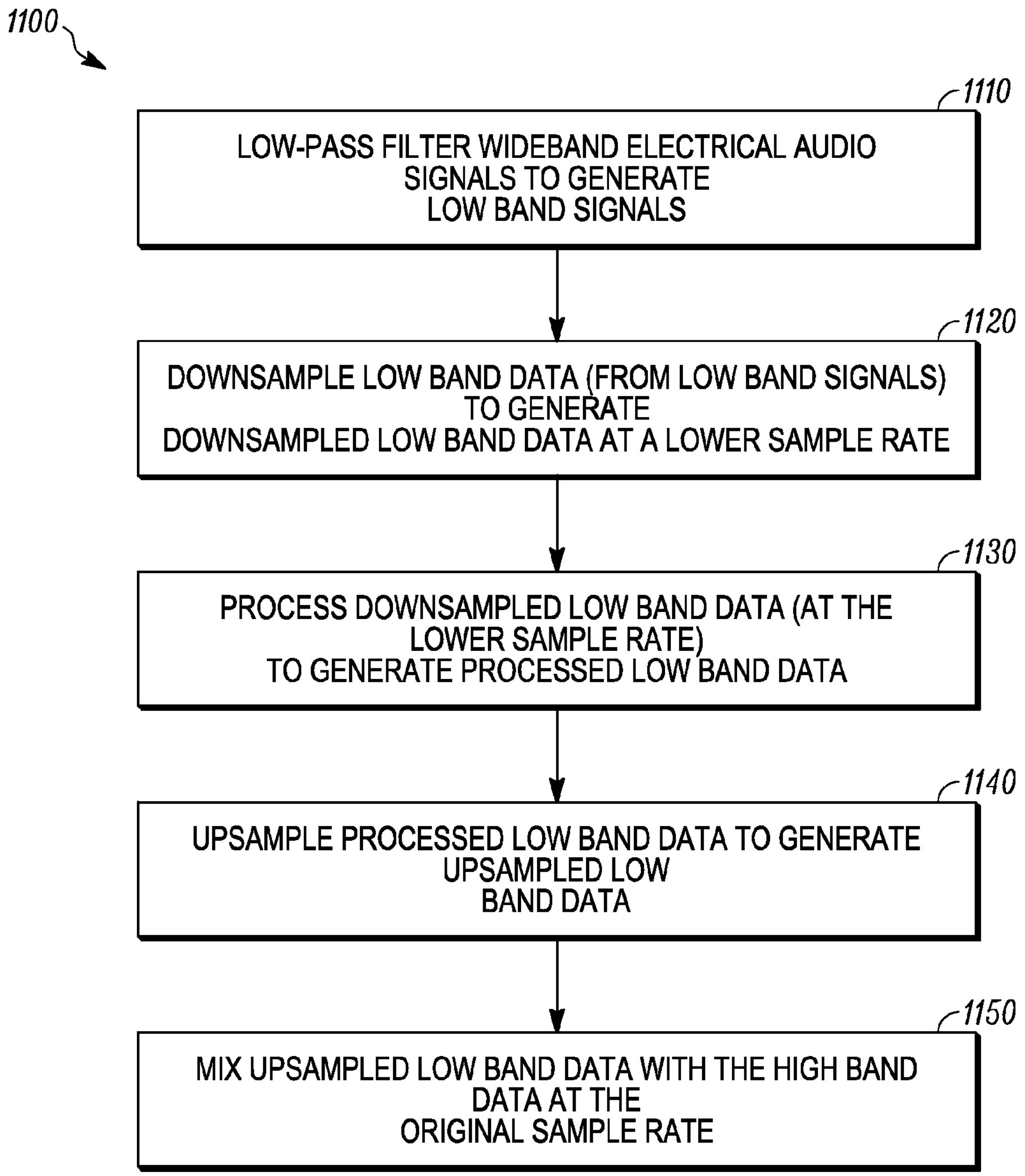
FIG. 11 is a flowchart that illustrates a method for low sample rate beamform processing in accordance with some of the disclosed embodiments.

FIG. 11 is a flowchart 1100 that illustrates a method for low sample rate beamform processing in accordance with some of the disclosed embodiments. Because only low band signals are beamformed, beamform processing can be reduced by downsampling the low band signals. The downsampled low band signals can be processed at the lower sampling rate, and then upsampled before being combined with their high band counterparts.

At step 1110, the audio crossover 450, 750, 950 processes (e.g., low-pass filters) the wideband electrical audio signals to generate low band signals. This step is described above with reference to FIGS. 4, 7, and 9. One of the advantages to filtering before beamform processing at the beamformer module 470, 770, 970 is that the low band signals can be downsampled prior to beamform processing, which allows the beamformer module 470, 770, 970 to process the low band data at a lower sample rate.

At step 1120, a DSP element downsamples low band data (from low band signals) to generate downsampled low band data at a lower sample rate. The DSP element can be implemented, for example, at the beamformer module 470, 770, 970 or in a separate DSP that is coupled between the crossover 450, 750, 950 and the beamformer module 470, 770, 970. After the low band signal has been converted to the lower sample rate, beamform processing can be done at this lower sample rate allowing for lower processing cost, lower power consumption, as well as increased stability in the filters that are used.

At step 1130, the beamformer module 470, 770, 970 beamform processes the downsampled low band data (at the lower sample rate) to generate beamformed processed low band data. Thus, splitting the wideband electrical audio signals into low and high band signals allows for the low band data to be beamform processed at a lower sample rate. This conserves significant processor resources and energy.

After beamform processing of the low band data is complete, the flowchart 1100 proceeds to step 1140, where another DSP element (implemented, for example, at the beamformer module 470, 770, 970) upsamples the beamform processed low band data to generate upsampled, beamformed low band data. The upsampled, beamformed low band data has a sampling rate that is the same as the original sampling rate at step 1110. The DSP element can implemented, for example, at the beamformer module 470, 770, 970 or in a separate DSP coupled between the beamformer module 470, 770, 970 and the combiner module 480, 780, 980.

At step 1150, the combiner module 480, 780, 980 combines or mixes each upsampled, beamformed low band data signal with its corresponding high band data signal at the original sample rate. This step is described above with reference to the combiner modules of FIGS. 4, 7 and 9.

Figure 12:
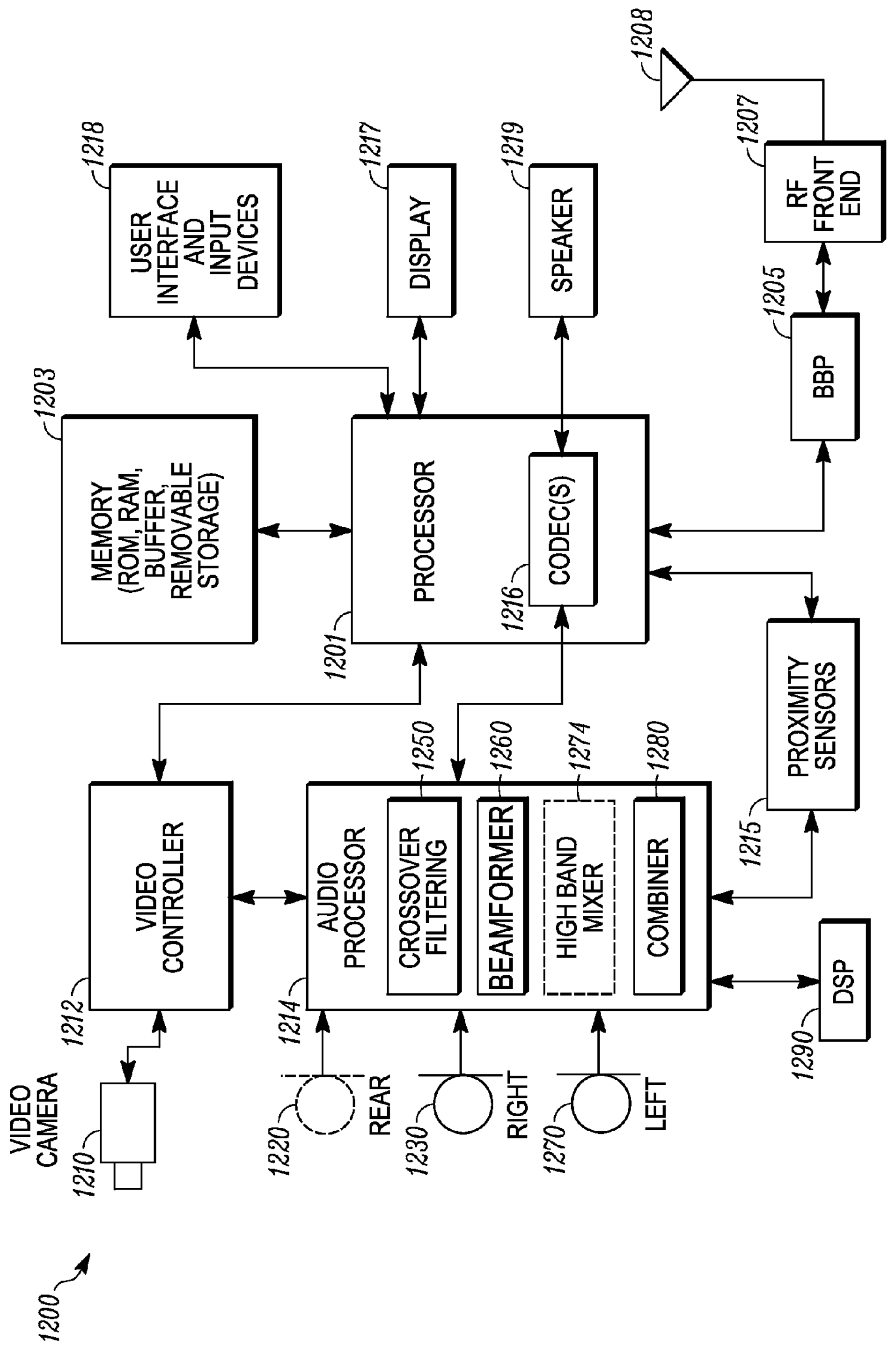
FIG. 12 is a block diagram of an electronic apparatus that can be used in one implementation of the disclosed embodiments.

FIG. 12 is a block diagram of an electronic apparatus 1200 that can be used in one implementation of the disclosed embodiments. In the particular example illustrated in FIG. 12, the electronic apparatus is implemented as a wireless computing device, such as a mobile telephone, that is capable of communicating over the air via a radio frequency (RF) channel.

The electronic apparatus 1200 includes a processor 1201, a memory 1203 (including program memory for storing operating instructions that are executed by the processor 1201, a buffer memory, and/or a removable storage unit), a baseband processor (BBP) 1205, an RF front end module 1207, an antenna 1208, a video camera 1210, a video controller 1212, an audio processor 1214, front and/or rear proximity sensors 1215, audio coders/decoders (CODECs) 1216, and a user interface 1218 that includes input devices (keyboards, touch screens, etc.), a display 1217, a speaker 1219 (i.e., a speaker used for listening by a user of the electronic apparatus 1200), and two or more microphones 1220, 1230, 1270. The various blocks can couple to one another as illustrated in FIG. 12 via a bus or other connections. The electronic apparatus 1200 can also contain a power source such as a battery (not shown) or wired transformer. The electronic apparatus 1200 can be an integrated unit containing all the elements depicted in FIG. 12 or fewer elements, as well as any other elements necessary for the electronic apparatus 1200 to perform its particular functions.

As described above, the microphone array has at least two pressure microphones and in some implementations may include three microphones. The microphones 1220, 1230, 1270 can operate in conjunction with the audio processor 1214 to enable acquisition of wideband audio information in wideband audio signals across a full audio frequency bandwidth of 20 Hz to 20 kHz. The audio crossover 1250 generates low band signals and high band signals from the wideband electrical audio signals, as described above with reference to FIGS. 4, 7, and 9. The beamformer 1260 generates low band beamformed signals from the low band signals, as described above with reference to FIGS. 4, 7, and 9. The combiner 1280 combines the high band signals and the low band beamformed signals to generate modified wideband audio signals, as described above with reference to FIGS. 4, 7, and 9. In some embodiments, the optional high band audio mixer 1274 can be implemented. The crossover 1250, beamformer 1260, and combiner 1280, and optionally the high band audio mixer 1274, can be implemented as different modules at the audio processor 1214 or external to the audio processor 1214.

The other blocks in FIG. 12 are conventional features in this one exemplary operating environment, and therefore for sake of brevity will not be described in detail herein.

It should be appreciated that the exemplary embodiments described with reference to FIGS. 1-12 are not limiting and that other variations exist. It should also be understood that various changes can be made without departing from the scope of the invention as set forth in the appended claims and the legal equivalents thereof. The embodiment described with reference to FIGS. 1-12 can be implemented a wide variety of different implementations and different types of portable electronic devices. While it has been assumed that low pass filters are used in some embodiments, in other implementations, a low pass filter and delay filter can be combined into a single filter in branches to implement a serial application of those filters. In addition, certain aspects of the crossover can be adjusted such that placement of the band filtering is equivalently moved to before or after the beamform processing and mixing operations. For instance, low pass filtering could be done after beamform processing and high pass filtering after the direct microphone output mixing.

Those of skill will appreciate that the various illustrative logical blocks, modules, circuits, and steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. As used herein the term "module" refers to a device, a circuit, an electrical component, and/or a software based component for performing a task. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the connecting lines or arrows shown in the various figures contained herein are intended to represent example functional relationships and/or couplings between the various elements. Many alternative or additional functional relationships or couplings may be present in a practical embodiment.

In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as “connect” or “coupled to” used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electronic apparatus comprising:

a microphone array with at least:

a first pressure microphone that generates a first wideband electrical audio signal in response to incoming sound waves, and a second pressure microphone that generates a second wideband electrical audio signal in response to the incoming sound waves;

a crossover with at least:

a first low-pass filter to generate a first low band signal comprising low frequency components of the first wideband electrical audio signal, a first high-pass filter to generate a first high band signal comprising high frequency components of the first wideband electrical audio signal, a second low-pass filter to generate a second low band signal comprising low frequency components of the second wideband electrical audio signal, and a second high-pass filter to generate a second high band signal comprising high frequency components of the second wideband electrical audio signal;

a beamformer module with at least:

a first correction filter to correct phase delay in the first low band signal to generate a first low band delayed signal, a second correction filter to correct phase delay in the second low band signal to generate a second low band delayed signal, a first summer module designed to sum the first low band signal and the second low band delayed signal to generate a first low band beamformed signal, and a second summer module designed to sum the second low band signal and the first low band delayed signal to generate a second low band beamformed signal; and a combiner module designed to combine the high band signals and the low band beamformed signals to generate modified wideband audio signals.

2. An electronic apparatus according to claim 1, wherein a crossover frequency of the crossover is determined based on a distance between the at least two pressure microphones.

3. An electronic apparatus according to claim 1, wherein a crossover frequency of the crossover is determined such that the high band signals include a first resonance of the at least two pressure microphones.

4. An electronic apparatus according to claim 1, wherein the low band signals are omnidirectional and the high band signals are not omnidirectional.

5. An electronic apparatus according to claim 1, wherein the modified wideband audio signals comprise a linear combination of the high band signals and the low band beamformed signals.

6. An electronic apparatus having according to claim 1, wherein the combiner module comprises:

a first combiner module designed to sum the first high band signal and the first low band beamformed signal to generate a first modified wideband audio signal that corresponds to a right channel stereo output; and a second combiner module designed to sum the second high band signal and the second low band beamformed signal to generate a second modified wideband audio signal that corresponds to a left channel stereo output.

7. An electronic apparatus according to claim 1, further comprising:

a video camera positioned on a front-side of the electronic apparatus, wherein the first pressure microphone is disposed near a right-side of the electronic apparatus and the second pressure microphone is disposed near a left-side of the electronic apparatus, wherein a pattern of the first low band beamformed signal generally points to the right and a pattern of the second low band beamformed signal points to the left.

8. An electronic apparatus according to claim 1, wherein the microphone array also comprises:

a third pressure microphone that generates a third wideband electrical audio signal in response to the incoming sound waves, and wherein the crossover also comprises:

a third low-pass filtering module to generate a third low band signal comprising low frequency components of the third wideband electrical audio signal; and a third high-pass filtering module to generate a third high band signal comprising high frequency components of the third wideband electrical audio signal.

9. An electronic apparatus according to claim 8, further comprising:

a video camera positioned on a front-side of the electronic apparatus, wherein the first pressure microphone is disposed near a right side of the electronic apparatus, and the third pressure microphone is disposed near a left side of the electronic apparatus, and the third pressure microphone is disposed near a rear-side of the electronic apparatus.

10. An electronic apparatus according to claim 8, wherein the beamformer module generates the low band beamformed signals based on the first low band signal, the second low band signal, and the third low band signal, wherein the combiner module is designed to mix the low band beamformed signals, the first high band signal, and the second high band signal to generate:

a first modified wideband audio signal that corresponds to a right channel stereo output signal; and a second modified wideband audio signal that corresponds to a left channel stereo output signal.

11. An electronic apparatus according to claim 8, wherein the beamformer module generates a plurality of low band beamformed signals based on the first low band signal, the second low band signal, and the third low band signal, wherein the plurality of low band beamformed signals have main lobes oriented to a front right, a front center, a front left, a rear left, and a rear right of the electronic apparatus.

12. An electronic apparatus according to claim 11, further comprising:

a high band audio mixer module for selectively combining the first high band signal, the second high band signal, and the third high band signal to generate a plurality of multi-channel high band non-beamformed signals comprising:

a front-right-side non-beamformed signal (not shown),
a front-left-side non-beamformed signal (not shown),
a front-center non-beamformed signal (not shown),
a rear-right-side non-beamformed signal (not shown), and
a rear-left-side non-beamformed signal (not shown).

13. An electronic apparatus according to claim 12, wherein the combiner module is designed to generate, based on the plurality of low band beamformed signals and the plurality of multi-channel high band non-beamformed signals, a plurality of wideband multi-channel audio signals comprising:

a front-right-side channel output,
a front-left-side channel output,
a front-center channel output,
a rear-right-side channel output, and
a rear-left-side channel output.

14. An electronic apparatus according to claim 1 further comprising:

a first digital signal processor element, coupled to the crossover, for downsampling the low band signals; and a second digital signal processor element, coupled to the beamformer module, for upsampling the low band beamformed signals.

15. A method, comprising:

generating wideband electrical audio signals in response to incoming sound waves;

generating low band signals and high band signals from the wideband electrical audio signals;

downsampling the low band signals to form downsampled low band signals;

generating low band downsampled beamformed signals from the downsampled low band signals;

upsampling the low band downsampled beamformed signals to produce low band beamformed signals; and combining the high band signals and the low band beamformed signals to generate modified wideband audio signals.

16. A method according to claim 15, wherein the generating low band signals and high band signals from the wideband electrical audio signals comprises:

filtering the wideband electrical audio signals to generate the low band signals and the high band signals, wherein frequencies of the low band signals are less than a crossover frequency and frequencies of the high band signals are greater than or equal to the crossover frequency, and wherein the crossover frequency is determined based on a distance between at least two pressure microphones.

17. A method according to claim 15, wherein the modified wideband audio signals comprise a linear combination of the high band signals and low band beamformed signals.

* * * * *